United States Patent
Noureldin et al.

(12) 
(10) Patent No.: US 6,668,465 B2
(45) Date of Patent: Dec. 30, 2003

(54) CONTINUOUS MEASUREMENT-WHILE-DRILLING SURVEYING

(75) Inventors: Aboelmagd Noureldin, Calgary (CA); Herb Tabler, Edmonton (CA); Winston Smith, Calgary (CA); Dave Irvine-Halliday, Calgary (CA); Martin P. Mintchev, Calgary (CA)

(73) Assignee: University Technologies International Inc., Calgary (CA)

(*) Notice: Subject to any disclaimer, the term of this patent is extended or adjusted under 35 U.S.C. 154(b) by 0 days.

(21) Appl. No.: 09/790,591

(22) Filed: Feb. 23, 2001

(65) Prior Publication Data

US 2002/0133958 A1 Sep. 26, 2002

Related U.S. Application Data

(60) Provisional application No. 60/262,400, filed on Jan. 19, 2001.

(51) Int. Cl.$^7$ .............................................. E21B 47/22
(52) U.S. Cl. ............................... 33/304; 33/313; 175/45
(58) Field of Search ................. 33/302, 304, 308, 33/310, 312, 313, 324, 624, 625; 175/45, 40, 50

(56) References Cited

U.S. PATENT DOCUMENTS

| | | | |
|---|---|---|---|
| 4,163,324 A | 8/1979 | Russell et al. ............... 33/313 |
| 4,197,654 A * | 4/1980 | Van Steenwyk et al. ...... 33/304 |
| 4,361,192 A | 11/1982 | Trowsdale .............. 340/853.5 |
| 4,371,838 A | 2/1983 | Griscom ................. 324/244.1 |
| 4,450,406 A | 5/1984 | Bobb ........................ 324/247 |
| 4,537,067 A * | 8/1985 | Sharp et al. ............. 73/152.13 |
| 4,542,647 A | 9/1985 | Molnar .................... 73/152.24 |
| 4,594,790 A | 6/1986 | Engebretson ................ 33/304 |
| 4,682,421 A | 7/1987 | Van Dongen ................ 33/302 |
| 4,712,306 A | 12/1987 | Cahill et al. ................. 33/304 |
| 4,756,088 A * | 7/1988 | Russell et al. ............... 33/312 |
| 4,799,391 A * | 1/1989 | Lara ......................... 73/865.8 |
| 4,812,977 A | 3/1989 | Hulsing ....................... 702/6 |
| 4,833,787 A * | 5/1989 | Van Steenwyk ............ 33/302 |
| 4,877,201 A * | 10/1989 | Trayner .................... 244/3.21 |
| 4,993,274 A * | 2/1991 | Downton .................... 74/5.46 |
| 5,012,412 A | 4/1991 | Helm .......................... 702/9 |
| 5,112,126 A * | 5/1992 | Graebner .................. 356/141.5 |
| 5,155,916 A | 10/1992 | Engebreton ................. 33/302 |
| 5,294,972 A | 3/1994 | Kemmler .................... 356/462 |
| 5,432,699 A * | 7/1995 | Hache et al. .................. 702/9 |
| 5,435,069 A | 7/1995 | Nicholson .................... 33/304 |
| 5,452,518 A | 9/1995 | DiPersio ..................... 33/304 |
| 5,787,997 A | 8/1998 | Hartmann .................... 175/45 |
| 5,821,414 A * | 10/1998 | Noy et al. ................ 73/152.54 |
| 5,850,624 A * | 12/1998 | Gard et al. .................. 702/92 |
| 5,896,199 A * | 4/1999 | Mark et al. ................ 356/465 |
| 6,021,577 A | 2/2000 | Shiells et al. ................. 33/304 |
| 6,315,062 B1 * | 11/2001 | Alft et al. ..................... 175/45 |
| 6,347,282 B2 * | 2/2002 | Estes et al. .................... 702/6 |

* cited by examiner

Primary Examiner—Diego Gutierrez
Assistant Examiner—R. Alexander Smith
(74) Attorney, Agent, or Firm—Bennett Jones LLP

(57) ABSTRACT

A continuous measurement-while-drilling surveying apparatus includes a fiber optic gyroscope sensitive to rotation about the tool spin axis of the bottom hole assembly and a second fiber optic gyroscope sensitive to rotation of the bottom hole assembly about an axis normal to the tool spin axis. The first gyroscope may be shaped as a torus to accommodate flow of drilling mud through the bottom hole assembly. The outputs of the first and second gyroscopes are processed together with acceleration signals from three accelerometers in a microprocessor which determines the orientation, velocity and position of the bottom hole assembly on a continuous basis.

11 Claims, 14 Drawing Sheets

CONTINUOUS MEASUREMENT-WHILE-DRILLING SURVEYING

This Application claims priority to U.S. Provisional Patent Application No. 60/262,400 filed Jan. 19, 2001 for "Continuous Measurement-While-Drilling Surveying".

FIELD OF THE INVENTION

The present invention relates to continuous measurement-while-drilling surveying methods and apparatuses.

BACKGROUND OF THE INVENTION

To obtain hydrocarbons such as oil and gas, boreholes are drilled by rotating a drill bit attached at a drill string end. A large proportion of the current drilling activity involves directional drilling, i.e., drilling deviated and horizontal boreholes to increase the hydrocarbon production and/or to withdraw additional hydrocarbons from the earth's formations. Modern directional drilling systems generally employ a drill pipe having a drill bit at the bottom that is rotated by a drill motor or a "mud motor". Pressurized drilling fluid or "mud" or "drilling mud" is pumped into the drill pipe to rotate the drill motor and to provide lubrication to various members of the drill string including the drill bit. The drill bit and drill motor form part of what is known as the bottom hole assembly ("BHA"). As required the drill pipe is rotated by a prime mover, such as a motor, to facilitate directional drilling and to drill vertical boreholes.

Measurement-While-Drilling (MWD) surveying for directional and horizontal drilling processes is performed to provide the orientation and the position of the BHA [Conti, 1999]. Azimuth, the inclination and the tool face angles determine the orientation of the BHA, while latitude, longitude and altitude determine the position of the BHA. The altitude directly determines the true vertical depth of the BHA. State of the art MWD surveying techniques are based on magnetic surveying which incorporates three-axis magnetometers and three-axis accelerometers arranged in three-mutually orthogonal directions. The three-axis accelerometers monitor the Earth gravity field to provide the inclination and the tool face angles. This information is combined with the magnetometer measurements of the Earth magnetic field to provide the azimuth [FIG. 1, Russel et al., 1979].

The magnetic surveying system determines the BHA orientation at certain survey stations with the assumption that the error which modifies the Earth's magnetic field vector at the surveying instrument is in the direction of the borehole [Russel et al., 1979]. This assumption is justified by installing these magnetometers inside a non-magnetic housing. Such housing system necessitates the use of non-magnetic drill collars around the surveying equipment at a cost approaching $30,000 per single installation [Rehm et al., 1989].

Although simple, the magnetic surveying system suffers from several inadequacies especially within the drilling environment [Thorogood, 1990; Thorogood et al., 1986]. The presence of downhole ore deposits deviate the measurements of the Earth magnetic field even with the non-magnetic drill collars surrounding the surveying instruments. In addition, magnetic surveying tools located in non-magnetic drill collars are subject to the influence of the other steel components of the drill string. It has been shown that drill string induced surveying error increases with inclination and as the borehole direction approaches the east-west azimuth. Drill string magnetic interference is particularly noticeable when inclination exceeds 30°. Although it has been reported that the effect of the drill string magnetic interference could be reduced (mitigated but never entirely eliminated) by running long lengths of non-magnetic materials above and below the survey instruments [Grindord et al., 1983], this solution could affect the cost benefits of the horizontal drilling technology. The effect of drill string magnetic interference as well as the presence of downhole ore deposits can neither be quantified nor compensated. In addition to these two effects, geomagnetic influences play an important role in the accuracy of the magnetic surveying system [Parkinson, 1983]. Geomagnetic influences are defined by the variation of the dip angle, the declination and the total magnetic field strength with respect to time. The dip angle is the angle between the direction of the Earth's magnetic field and the horizontal plane. The declination is the angle between the magnetic north and the true north. It was recorded that during any given day at a random location the standard deviations of the dip angle, the declination and the magnetic field strength were 0.3v, 0.9° and 0.3$\mu$-Tesla respectively [Parkinson, 1983]. The variation in the geomagnetic field is quite significant in relation to the performance capabilities of the magnetic surveying tools currently used. Therefore, geomagnetic effects must be taken into account when considering absolute survey accuracy and impose definite limitations on the accuracy levels that can ultimately be achieved.

Several investigations have been reported to improve the magnetic surveying accuracy. Shiells and Kerridge (2000) introduced the interpolated in-field referencing method in which absolute local geomagnetic field data is determined from spot measurements of the Earth's magnetic field. These measurements are taken at local site which is sufficiently close to the i; drilling site so that the measurement data is indicative of the Earth's magnetic field at the drilling site but is sufficiently remote from the drilling site so that the measurement data is unaffected by magnetic interference from the drilling site. This technique compensates for the geomagnetic influences but the measurements taken by the magnetometers still suffer from the drill string magnetic interference. In addition, measurements of the geomagnetic field in a local site might not be applicable in an area that has many drilling rigs. Moreover, such technique adds more complexity that may give rise to additional cost.

Hartmann (1998) introduced a method to improve the accuracy of borehole surveying. This method is based on determining the uncertainty in the magnetic field measurements by comparing the measured magnetic field with a corresponding known value at specific location. However, this method does not take into account two phenomena. The first phenomenon is the increase of the drill string magnetic interference at high inclinations. The second is the presence of ore deposits that can be found randomly downhole. These two phenomena add additional errors that are not taken into consideration when referencing the theoretical value of the magnetic field to the measured value at the known location.

Dipersio (1995) introduced a new method for the compensation of geomagnetic influences. This method depends on matching both the calculated magnetic field strength and the calculated dip angle to their corresponding nominal values at a particular geomagnetic location. This results in determining an error-free value of the axial component of the magnetic field which is directly used to determine the azimuth. However, at high inclinations, the drill string magnetic interference generates additional errors in the cross-axial directions.

Several other techniques have been described for magnetic MWD surveying [Nicholson, 1995; Engebretson, 1992; Helm, 1991; van Dongen et al., 1987; Trowsdale, 1982]. However, it is clear that the major weaknesses of the present directional sensing instruments stem from the use of magnetometers for monitoring the azimuth and from the hostile environment in which these devices work. The problem encountered with the use of magnetometers is the presence of massive amount of steel around the drilling rig. The abundance of ferromagnetic material necessitates the separation of the magnetometers by non-magnetic drill collars. Aside from the cost of utilizing non-magnetic drill collars, their use introduces a second problem. Since the non-magnetic drill collars impose an additional weight on the drill bit, the surveying tools are separated from the bearing assembly and the drill bit by about 30 feet [Conti, 1989; Rehm at al., 1989]. Elimination of the non-magnetic drill collars could reduce the distance between the instrument package and the drill bit by approximately 50%. The third problem associated with the use of magnetometers is their lack of reliability when used underground due to the deviation of the Earth's magnetic field from ore deposits.

It is known to use strapdown inertial navigation systems for borehole surveying using probes. Borehole surveying is performed after finishing the drilling process, or sections of the drilling process, for the purpose of quality assurance. U.S. Pat. No. 4,542,647 describes a borehole inertial guidance system which utilizes two ring laser gyroscopes having their sensitive axes normal to the borehole axis. In this case, azimuth is determined by a synthetic rotation signal provided by three-axis accelerometers. While this configuration may be suitable for borehole mapping, it fails to be useful for MWD surveying. There is considerable rotation about the tool-spin axis in a MWD process making the use of a synthetic signal to monitor this rotation and therefore azimuth useless.

In addition, ring laser gyros are unsuitable for MWD processes because they cannot withstand the harsh conditions encountered near the BHA during the drilling process. In particular, the vibration and shock forces associated with the progress of the drill bit impairs the effectiveness of ring laser gyros.

Therefore, there is a need in the art for a continuous measurement-while-drilling surveying method and apparatus which mitigates the difficulties of the prior art.

SUMMARY OF THE INVENTION

The present invention relates to the replacement of the MWD magnetic surveying system with the technology of inertial navigation. Inertial navigation systems (INS) determine the position, velocity and orientation of a moving body in three-dimensional space by integrating the measured components of the acceleration and the angular velocity of the body [Titteron et al., 1997]. The measurements of acceleration and angular velocity are provided by three-axis accelerometers and three-axis gyroscopes arranged in three mutually orthogonal directions.

Currently available 3-gyroscopes/3-accelerometers INS technology cannot provide high accuracy and small dimensions within the same setup and therefore at present, the direct installation of such system inside the BHA to replace the set of magnetometers is not feasible. Thus, the traditional high accuracy INS setup is not applicable downhole due to the limited space inside the BHA and the relatively large dimensions of the gyroscopes.

Therefore, herein disclosed is a method and apparatus for downhole strapdown INS utilizing only two novel gyroscopes. One gyroscope has its sensitive axis along the tool spin axis while the other has its sensitive axis normal to the tool spin axis and along the forward direction. This results in the removal of the costly non-magnetic drill collars because the gyroscopes are insensitive to magnetic fields. In one embodiment, the two gyroscopes are mounted inside the bearing assembly and are fiber optic gyroscopes (FOG). FOGs are suitable for the downhole drilling application because they do not contain moving parts, thus providing high reliability with no need for frequent calibration or maintenance [Kim, 1994; Merhav, 1993; Lefevre, 1993]. In addition, the FOGs exhibit low environmental sensitivity since they can withstand relatively high temperatures, shocks and vibrations [Noureldin et al., 1999; Noureldin et al., 2000]. Moreover, currently available FOGs are of small size, with a drift rate less than 1°/hr, long mean time between failure (60,000 hrs), no gravitational effects and excellent immunity to vibration and shock forces.

In one embodiment, the FOG that has its sensitive axis along the tool spin axis is prepared as torus to accommodate the flow of drilling fluid through the bearing assembly. The 3 accelerometers—2 FOG system is capable of providing continuous MWD surveying during the whole drilling process, up until the horizontal section of the well, instead of MWD station-based surveying. In addition, continuous MWD surveying is possible through an initial radical section of the well with 3 accelerometers and a single FOG which has its sensitive axis aligned with the tool spin axis. The initial radical section of the well may be that portion with an inclination less than about 45°, preferably less than about 30° and more preferably less than about 20°.

Therefore, in one aspect, the invention comprises a continuous measurement-while-drilling surveying apparatus for surveying the drilling progress of a bottom hole assembly ("BHA") comprising:

(a) a housing adapted to be part of the BHA, said housing having a tool-spin axis;

(b) a first fiber-optic gyroscope mounted within the housing for generating a first angular rotation signal representing angular rotation of the BHA about the tool-spin axis;

(c) a second fiber-optic gyroscope mounted within the housing for generating a second angular rotation signal representing angular rotation of the BHA about an axis normal to the tool-spin axis;

(d) accelerometer means for generating three acceleration signals representing the components of acceleration of the BHA along three mutually orthogonal axes;

(e) first processing means responsive to the acceleration signals for determining the angle of the BHA away from the vertical and for generating a third angular rotation signal representing rotation of the BHA about an axis normal to the sensitive axes of the first and second gyroscopes;

(f) second processing means responsive to the first, second and third angular rotation signals and the acceleration signals for transforming signals representing movement of the BHA in a BHA coordinate system to a earth local-level coordinate system;

(g) third processing means operatively connected to the second processing means for determining the orientation of the BHA, determining the velocity changes of the BHA, updating the velocity components of the BHA and updating the position components of the BHA.

The first gyroscope may be toroidal. The first, second and third processing means may be a general purpose computer programmed with appropriate software, firmware, a microcontroller, a microprocessor or a plurality of microprocessors, a digital signal processor or other hardware or combination of hardware and software known to those skilled in the art.

In another aspect of the invention, the invention is a method of continuous MWD surveying of a wellbore which includes, on completion, a vertical section, a radical section and a horizontal section, using a BHA comprising a first gyroscope having its sensitive axis aligned with the tool spin axis, a second gyroscope having its sensitive axis on an axis normal to the tool spin axis and three accelerometers arranged in three mutually orthogonal directions, said method comprising the steps of:

(a) receiving the rotation signals from the first gyroscope and the second gyroscope and the acceleration signals from the three accelerometers;

(b) establishing the desired azimuth direction;

(c) determining the pitch angle from the accelerometer signals;

(d) determining the rotation rate about an axis normal to the sensitive axes of the two gyroscopes by determining the time rate of change of the pitch angle;

(e) determining the effect of the earth rotation and local-level (l-frame) change of orientation to the angular changes monitored along the three axes and removing these two effects from the rotation rate signals;

(f) transforming the rotation signals from a BHA coordinate frame to the earth local-level coordinate frame;

(g) determining the pitch, roll and azimuth of the BHA;

(h) determining the time rate of change of the velocity of the BHA expressed in the l-frame and update the velocity components of the BHA; and (i) updating the position components of the BHA.

In one embodiment, this method is used for an initial portion of the radical section of the wellbore. The initial portion of the radical section of the well may be that portion with an inclination less than about 45°, preferably less than about 30° and more preferably less than about 20°. After the initial portion, the method is altered by switching the axes orientation of the two gyroscopes. Once the wellbore reaches the horizontal section and rotary mode drilling is required, the surveying method may then switch to station-based surveying.

DESCRIPTION OF THE INVENTION

The present invention provides for a continuous measurement-while-drilling surveying method and apparatus. All terms not defined herein have their common art-recognized meanings.

Strapdown Intertial Navigation

There are two common INS categories [Titteron et al., 1997; Britting, 1971]. The first category is the gimbaled INS that maintains a stationary platform for the accelerometers by torque motors. These systems use the angular rate measurements of the gyroscopes attached to the platform to control the motors. The second category is the strapdown INS (SINS) that mathematically transforms the output of the accelerometers attached to the body into a locally-leveled coordinate system before performing integration. These systems use the output of the gyroscopes attached to the body to continuously convert from body coordinate to locally leveled coordinate.

Figure 1:
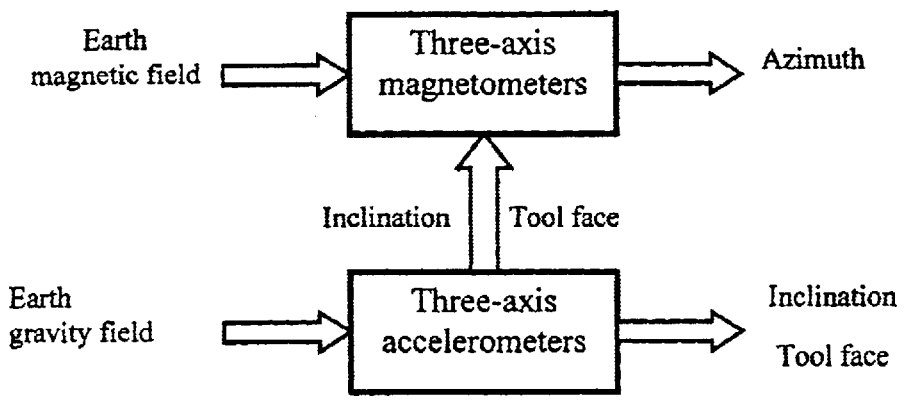
FIG. 1 is a block diagram illustrating the functionality of a prior art magnetic surveying system.
Figure 2:
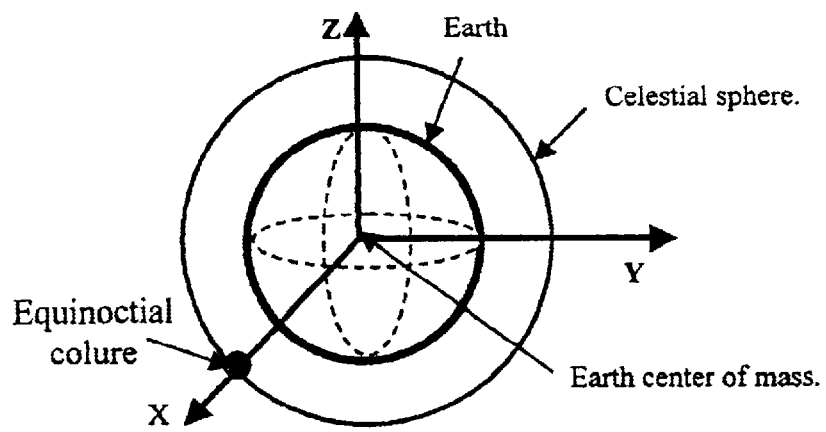
FIG. 2 is a sketch representing the inertial frame.
Figure 3:
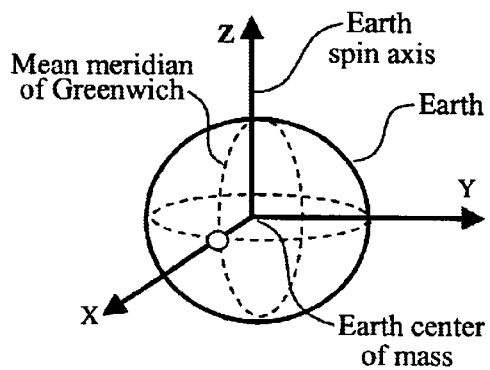
FIG. 3 is a sketch representing the Earth-fixed frame.
Figure 4:
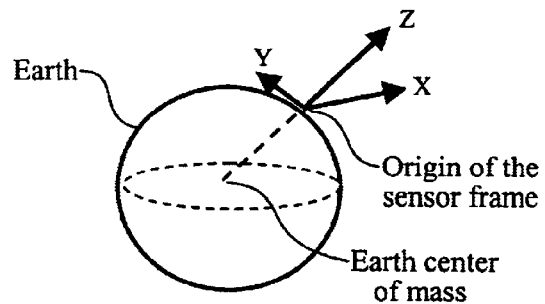
FIG. 4 is a sketch representing the local level frame.
Figure 5:
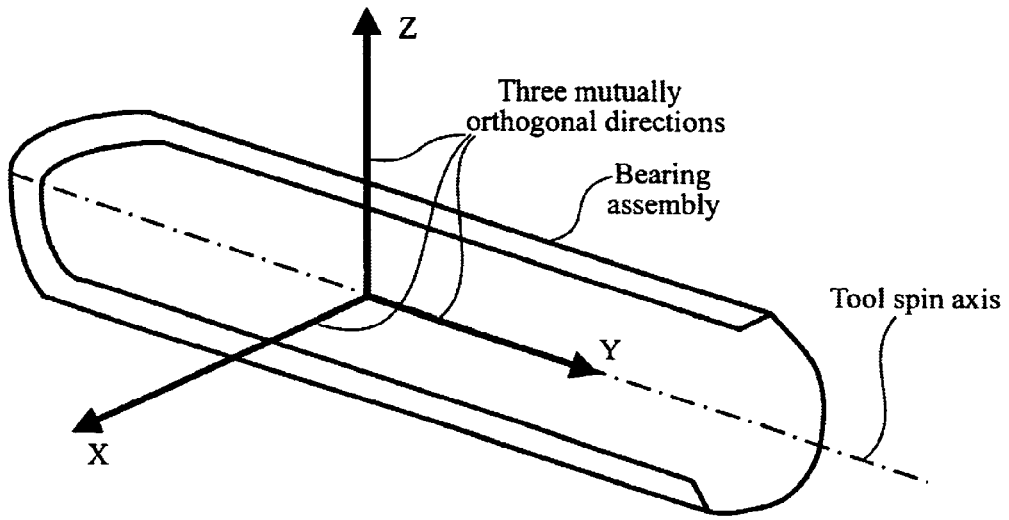
FIG. 5 is a sketch showing the body frame axes arranged inside the bearing assembly of a BHA.

Three reference frames are commonly used in the technology of inertial navigation [Schwarz, 1999; Salychev, 1998]. These are the inertial frame, the earth-fixed frame and the local level frame. The inertial frame (i-frame) is a non-rotating and non-accelerating frame. The origin of the inertial frame is at the center of mass of the Earth, its Z-axis is parallel to the spin axis of the Earth, its X-axis points toward the mean equinoctial comic and its Y-axis completes a right handed orthogonal frame (see FIG. 2). The Earth-fixed frame (e-frame) has its origin at the center of mass of the Earth with its Z-axis parallel to the spin axis of the Earth, X-axis pointing towards the mean meridian of Greenwich and Y-axis completing a right handed orthogonal frame (see FIG. 3). The local level frame (1-frame) has its origin at the origin of the sensor frame with its Z-axis orthogonal to the reference ellipsoid of the Earth and pointing upward, Y-axis pointing toward the geodetic north and X-axis completing a right handed orthogonal frame (see FIG. 4). When the inertial sensors (gyroscopes and accelerometers) are installed inside a moving object, they are oriented in three mutually orthogonal directions known as the body frame (b-frame). The axes of the b-frame point toward the forward (Y), transverse (X) and vertical (Z) directions (see FIG. 5).

The measurements of linear acceleration and angular velocities are taken in the b-frame. These measurements should be transformed into the corresponding reference frame within which they are processed to provide the position vector, the velocity vector and the attitude components. The transformation from the b-frame to the l-frame is performed with the rotation matrix $R_b^l$, which is expressed as a function of the attitude components (azimuth $\psi$, roll (tool face) $\phi$ and pitch (inclination) $\theta$) as follows:

$$R_b^l = \begin{bmatrix} \cos\psi\cos\phi - \sin\psi\sin\theta\sin\phi & -\sin\psi\cos\theta & \cos\psi\sin\theta + \sin\psi\sin\theta\cos\phi \\ \sin\psi\cos\phi + \cos\psi\sin\theta\sin\phi & \cos\psi\cos\theta & \sin\psi\sin\phi - \cos\psi\sin\theta\cos\phi \\ -\cos\theta\sin\phi & \sin\theta & \cos\theta\cos\phi \end{bmatrix} \quad (1)$$

The position of the BHA as described in the l-frame is expressed in terms of the curvilinear coordinates (latitude $\phi$, longitude $\lambda$ and altitude h). The velocity is alternatively expressed by three components along the East direction ($V^e$), north direction ($V^n$) and vertical direction ($V^u$). Therefore, the time rate of change of the position components is related to the velocity components as follows [Schwarz et al., 1990]:

$$\dot{r}^l = \begin{pmatrix} \dot{\varphi} \\ \dot{\lambda} \\ \dot{h} \end{pmatrix} = \begin{pmatrix} 0 & \frac{1}{M+h} & 0 \\ \frac{1}{(N+h)\cos\varphi} & 0 & 0 \\ 0 & 0 & 1 \end{pmatrix} \begin{pmatrix} V^e \\ V^n \\ V^u \end{pmatrix} = D^{-1} V^l \quad (2)$$

where

N: is the prime vertical radius of curvature of the Earth's surface (East-West);

M: is the corresponding meridian radius of curvature (North-South);

$D^{-1}$: is a 3-by-3 matrix defined as $$\begin{pmatrix} 0 & \frac{1}{M+h} & 0 \\ \frac{1}{(N+h)\cos\varphi} & 0 & 0 \\ 0 & 0 & 1 \end{pmatrix}.$$

Figure 6:
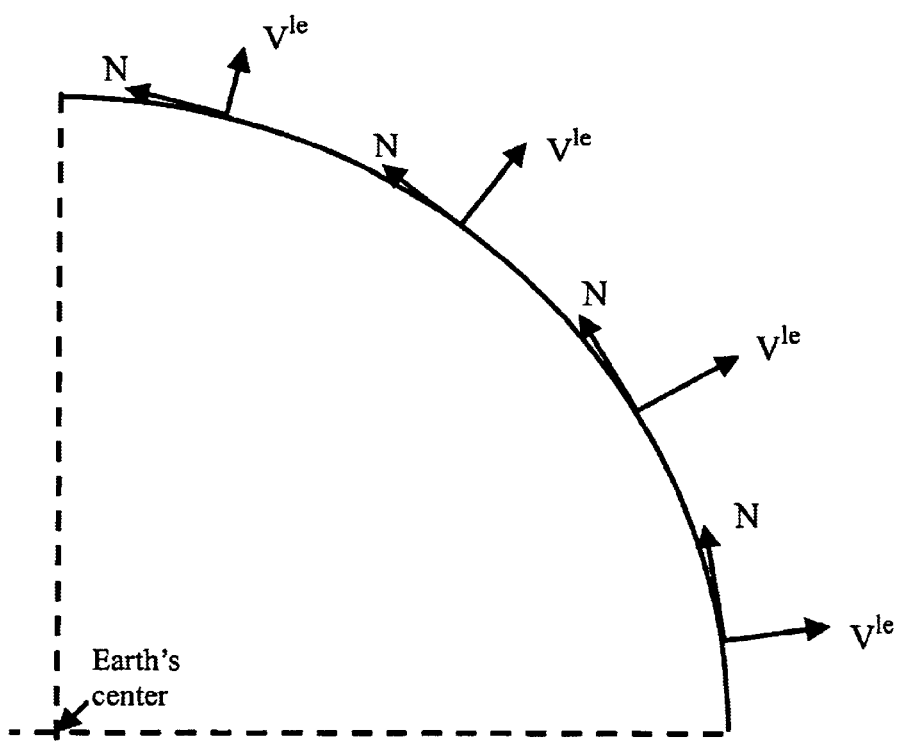
FIG. 6 shows the change of l-frame orientation along the Earth's surface.

The acceleration of the bearing assembly is measured in three mutually orthogonal directions in the b-frame $f^b = (f_x, f_y, f_z)^T$. These measurements are transformed into the l-frame using the rotation matrix $R_b^l$ ($f^l = R_b^l f^b$). However, the acceleration components expressed in the l-frame, $f^l$, can not directly give the velocity components of the bearing assembly due to three reasons. The first reason is due to the rotation rate of the Earth about its spin axis ($\omega^e = 15°/hr$) which is interpreted in the l-frame as $\omega_{ie}^l = (0\,\omega^e\cos\phi\;\omega^e\sin\phi)^T$. The second reason is the change of orientation of the l-frame with respect to the Earth as the bearing assembly penetrates the downhole formation. The l-frame change of orientation along one of the meridians can be shown on FIG. 6. This change of orientation is due to the definition of the local North and vertical directions. The North direction (N) is tangent to the meridian all the time while the vertical direction ($V^{le}$) is normal to the Earth's surface. This effect is interpreted as rotation rate vector expressed as $\omega_{el}^l = (-\dot{\phi}\;\dot{\lambda}\cos\phi\;\dot{\lambda}\sin\phi)^T$ which can be rewritten as $$\omega_{el}^l = \left( \frac{-V^n}{M+h} \; \frac{V^e}{N+h} \; \frac{V^e\tan\varphi}{N+h} \right)^T$$

(see equation 2). The third reason is the gravity field of the Earth which is given as $g^l = (0\;0\;-\gamma)^T$, where $\gamma$ is obtained from the well-known normal gravity model given as follows [Schwarz et al., 1999]:

$$\gamma = a_1(1 + a_2\sin^2\phi + a_3\sin^4\phi) + (a_4 + a_5\sin^2\phi)h + a_6h^2 \quad (3)$$

where $a_1 = 9.7803267715$ m/sec$^2$ $a_2 = 0.0052790414$ $a_3 = 0.0000232718$ $a_4 = -0.000003087691089$ 1/sec$^2$ $a_5 = 0.000000004397731$ 1/sec$^2$ $a_6 = 0.000000000000721$ 1/(m sec$^2$)

Then, the time rate of change of the velocity components $V^l$ of the bearing assembly while penetrating downhole can be expressed as follows [Schwarz et al., 1999]:

$$\dot{V}^l = R_b^l f^b - (2\Omega_{ie}^l + \Omega_{el}^l) V^l + g^l \quad (4)$$

where $\Omega_{ie}^l$ and $\Omega_{el}^l$ are the skew-symmetric matrices corresponding to $\omega_{ie}^l$ and $\omega_{el}^l$ respectively and they are expressed as follows:

$$\Omega_{ie}^l = \begin{pmatrix} 0 & -\omega^e\sin\varphi & \omega^e\cos\varphi \\ \omega^e\sin\varphi & 0 & 0 \\ -\omega^e\cos\varphi & 0 & 0 \end{pmatrix} \quad (5)$$

$$\Omega_{el}^l = \begin{pmatrix} 0 & \frac{-V^e\tan\varphi}{N+h} & \frac{V^e}{N+h} \\ \frac{V^e\tan\varphi}{N+h} & 0 & \frac{V^n}{M+h} \\ \frac{-V^e}{N+h} & \frac{-V^n}{M+h} & 0 \end{pmatrix} \quad (6)$$

The rotation matrix $R_b^l$ can be obtained by solving the following differential equations [Schwarz et al., 1999]:

$$\dot{R}_b^l = R_b^l \Omega_{lb}^b = R_b^l(\Omega_{ib}^b - \Omega_{il}^b) \quad (7)$$

where $\Omega_{ib}^b$ is the skew-symmetric matrix of the measurements of angular velocities provided by the gyroscopes. $\Omega_{ib}^b$ corresponds to the angular velocity vector $\omega_{ib}^b = (\omega_x\,\omega_y\,\omega_z)^T$ and is given as:

$$\Omega_{ib}^b = \begin{pmatrix} 0 & -\omega_z & \omega_y \\ \omega_z & 0 & -\omega_x \\ -\omega_y & \omega_x & 0 \end{pmatrix} \quad (8)$$

Since the gyroscopes measure both the Earth rotation and the change in orientation of the l-frame in addition to the angular velocities of the bearing assembly, the term $\Omega_{il}^b$ in equation 7 is subtracted from $\Omega_{ib}^b$ to remove these two effects. The term $\Omega_{il}^b$ consists of two parts. The first part is $\Omega_{ie}^b$ which accounts for the Earth rotation rate and the second part is $\Omega_{el}^b$ which accounts for the orientation change of the l-frame. Therefore, $\Omega_{il}^b$ can be written as follows:

$$\Omega_{il}^b = \Omega_{ie}^b + \Omega_{el}^b \quad (9)$$

Since $\omega_{ie}^b = R_l^b \omega_{ie}^l$ and $\omega_{el}^b = R_l^b \omega_{el}^l$, then $\omega_{il}^b = R_l^b(\omega_{ie}^l + \omega_{el}^l)$ and can be given as follows:

$$\omega_{il}^b = \left[\begin{pmatrix} 0 \\ \omega^e \cos\varphi \\ \omega^e \sin\varphi \end{pmatrix} + \begin{pmatrix} \frac{-V^n}{M+h} \\ \frac{V^e}{N+h} \\ \frac{V^e \tan\varphi}{N+h} \end{pmatrix}\right] = R_l^b \begin{pmatrix} \frac{-V^n}{M+h} \\ \frac{V^e}{N+h} + \omega^e \cos\varphi \\ \frac{V^e \tan\varphi}{N+h} + \omega^e \sin\varphi \end{pmatrix} \quad (10)$$

Consequently, the corresponding skew-symmetric matrix $\Omega_{il}^b$ can be determined.

When equations 2, 4 and 9 are combined together, they form what is known as the mechanization equations in the l-frame and they are usually given together as follows [Schwarz et al., 1990; Schwarz et al., 1999]:

$$\begin{pmatrix} \dot{r}^l \\ \dot{V}^l \\ \dot{R}_b^l \end{pmatrix} = \begin{pmatrix} D^{-1} V^l \\ R_b^l f^b - (2\Omega_{ie}^l + \Omega_{el}^l) V^l + g^l \\ R_b^l (\Omega_{ib}^b - \Omega_{il}^b) \end{pmatrix} \quad (11)$$

The inputs to these mechanization equations are the gyroscope and accelerometer measurements while the outputs are the curvilinear coordinates, three velocity components and three attitude components. The l-frame is chosen to describe the drill bit motion for three reasons. The first is that the axes of the l-frame are aligned towards the local East, North and vertical (normal to the Earth's surface and pointing upward). Using this orientation, the pitch, the roll and the azimuth angles describing the drill bit attitude (inclination, tool face and azimuth) can be obtained directly as outputs of the mechanization equations solved in the l-frame. The second reason for choosing the l-frame is that the geodetic coordinates expressing the drill bit latitude, longitude and depth can be obtained directly by solving the mechanization equations described in this frame. Finally, the computational errors in the navigation parameters on the horizontal plane (North-East plane) are bounded due to Schuller's effect. This effect stipulates that the inertial system errors of the horizontal plane components are coupled together producing what is called a Schuller loop [Mohammed, 1999; Titterton et al., 1997]. Therefore these errors oscillate with frequency called the Schuller frequency (1/5000 Hz).

Apparatus

At present, the FOG size determines the overall size of the inertial measurement unit. As mentioned earlier, present technological level of FOG-based inertial measurement units do not permit direct installation of 3-FOGs inside the BHA. Therefore, the present invention comprises a novel structure of inertial measurement unit with two specially designed FOGs in order to accommodate space and precision requirements. These two FOGs monitor two rotations rate signals along the Y and Z directions of the b-frame axes. The third rotation rate signal may be generated using the time rate of change of the inclination angle calculated with the three-axis accelerometer measurements. The two FOGs and the three-axis accelerometers may be mounted anywhere inside the drill pipe and the technique provided in the following sections can process their measurements to determine the surveying data.

Figure 7:
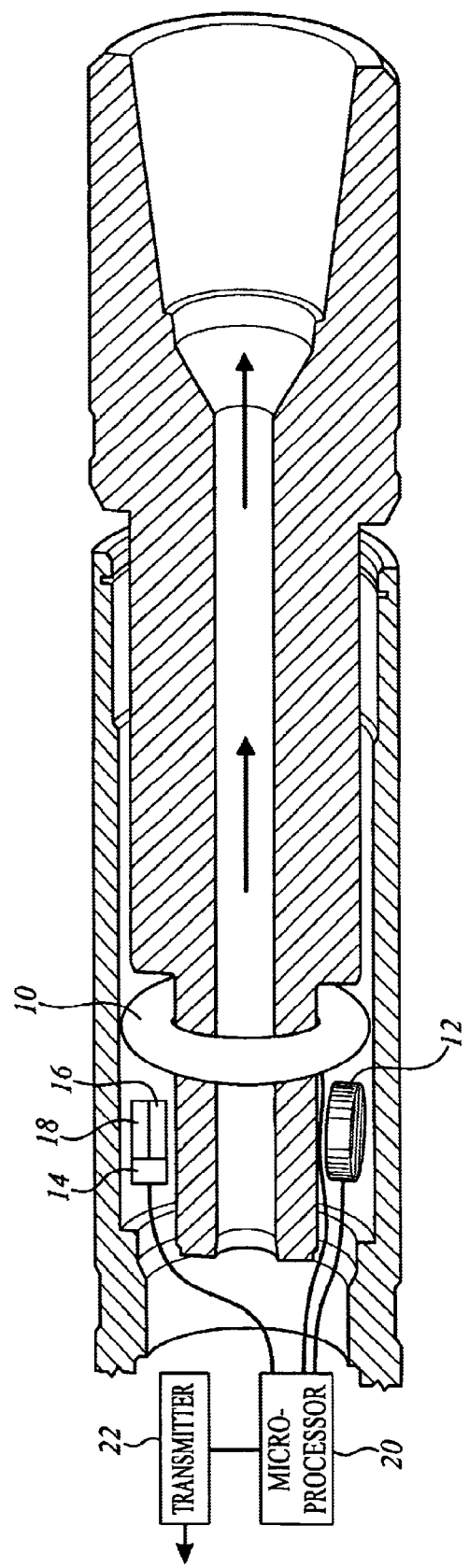
FIG. 7 shows the arrangement of the fiber optic gyroscopes inside a bearing assembly.

In one embodiment, the MWD inertial surveying sensors are fitted inside the bearing assembly close behind the drill bit as is shown in FIG. 7. The system comprises a first toroidal FOG (10), a second FOG (12), three accelerometers (14, 16, 18), a microprocessor (20), wireless communication transmitter (22) and a power source such as a battery. The microprocessor (20) receives the output signals from the two FOGs (10, 12) and the three accelerometers (14, 16, 18) and determines the inertial navigation components as described herein. These components are then transmitted to the surface for review by a drilling engineer. Alternatively, some or all of the processing may take place at the surface if the output signals of the inertial sensors are transmitted to the surface. Standard transmission or telemetry apparatus and methods may be used, as is well known in the art of MWD.

Figure 8:
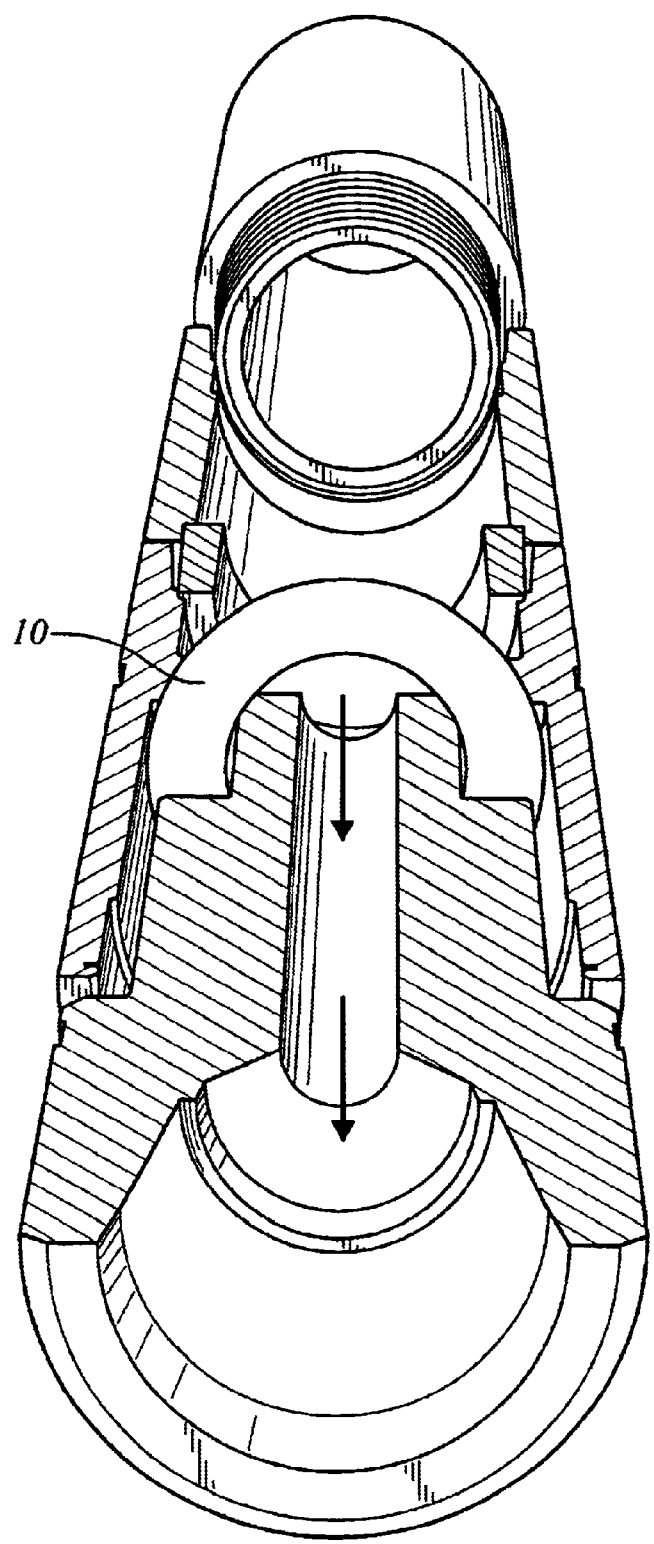
FIG. 8 is a bottom view for the bearing assembly showing the flow of mud through the toroidal FOG.

The toroidal FOG (10) is installed with its sensitive axis along the tool spin axis. It's shape allows the flow of mud through the drill pipe as is clearly shown in FIG. 8. The dimensions of the toroidal FOG (10) are dictated by the dimensions of the bearing assembly. The second FOG (12) is installed so that its sensitive axis is normal to the tool spin axis and towards the forward direction (Y-axis) Since its sensitive axis is normal to the tool spin axis, this FOG is denoted as the normal FOG (12). Both FOGs should preferably have drift rate less than 1 deg./hr and angle random walk of less than 0.1 deg./hr/$\sqrt{\text{Hz}}$ in 100 Hz bandwidth. The bias drift is defined as the deviation in the measured rotation rate at constant temperature. The angle random walk is the broadband random noise component at the FOG output that results either from the shot noise or the thermal noise in the photodetector.

The three-axis accelerometers (14, 16, 18) are arranged in three mutually orthogonal directions with one of them having its sensitive axis parallel to the tool spin axis.

Standard wireless communication between the system inside the bearing assembly and the surface MWD processor is provided [Skillingstad, 2000]. A power source such as a battery package provides the necessary power supply to the two FOGs, the accelerometers, the microprocessor and the wireless communication system.

Once the vertical section of the well is established, the horizontal drilling process involves three main tasks:

1. Establishing the desired azimuth direction while the drill pipe is still in the vertical direction.
2. Drilling the radical section of the well using steering mode of operation.
3. Drilling the horizontal section of the well with using rotary mode of operation.

The Establishment of the Desired Azimuth Direction

In order to establish accurately the azimuth direction, precise value of the initial azimuth should be known. This initial azimuth value is determined when the whole system is completely stationary. Therefore, the two FOGs monitor the Earth rotation, while the accelerometers monitor the Earth gravity. The Earth rotation vector monitored by the gyroscopes, $\omega_{ie}^b$, and the Earth rotation vector expressed in the l-frame, $\omega_{ie}^l$, are related through the rotation matrix $R_l^b = (R_b^l)^T$ which transforms the l-frame to the b-frame. This relationship can be written as follows:

$$\omega_{ie}^b = (\omega_x \omega_y \omega_z)^T = R_l^b \omega_{ie}^l = \begin{pmatrix} \cos\psi\cos\phi - \sin\psi\sin\theta\sin\phi & \sin\psi\cos\phi + \cos\psi\sin\theta\sin\phi & -\cos\theta\sin\phi \\ -\sin\psi\cos\theta & \cos\psi\cos\theta & \sin\theta \\ \cos\psi\sin\phi + \sin\psi\sin\theta\cos\phi & \sin\psi\sin\phi - \cos\psi\sin\theta\cos\phi & \cos\theta\cos\phi \end{pmatrix} \begin{pmatrix} 0 \\ \omega^e\cos\varphi \\ \omega^e\sin\varphi \end{pmatrix} \quad (12)$$

Figure 9:
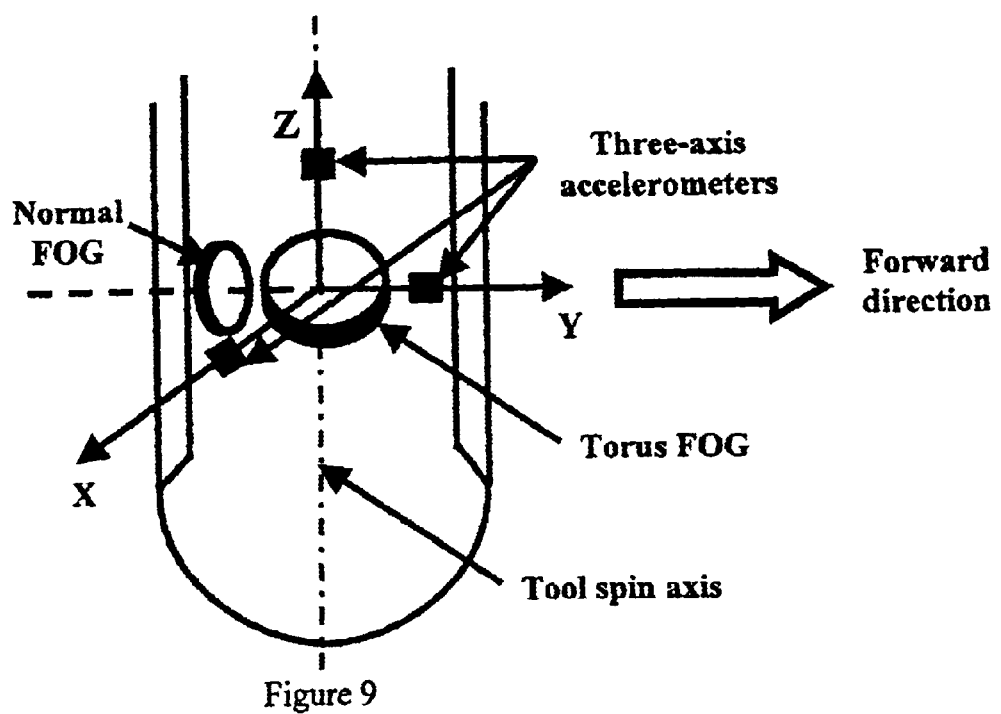
FIG. 9 shows the initial arrangement of the FOGs and the accelerometers with the body frame axes inside the bearing assembly.

The body frame axes are aligned as shown on FIG. 9 with the normal FOG having its sensitive axis along the Y-axis and the toroidal FOG having its sensitive axis along the Z-axis (the tool spin axis). Using equation 12, the rotation rate measurement provided by the normal FOG, $\omega_y$, can be given as function of the Earth rotation rate $\omega^e$ as follows:

$$\omega_y = (\cos\psi\cos\theta)\omega^e\cos\phi + (\sin\theta)\omega^e\sin\phi \quad (13)$$

Consequently, the azimuth can be determined as follows:

$$\cos\psi = \frac{\frac{\omega_y}{\omega^e\cos\varphi} - \sin\theta\tan\varphi}{\cos\theta} \quad (14)$$

Since the bottom hole assembly is almost in the vertical direction, the inclination angle (i.e. the pitch angle, $\theta$) is very close to zero. Therefore, we can simplify equation 14 by considering $\sin\theta \approx 0$ and $\cos\theta > 1$. The initial azimuth can then be given as:

$$\cos\psi = \frac{\omega_y}{\omega^e\cos\varphi} \quad (15)$$

It should be noted that equation 15 has a singularity when the latitude angle $\phi$ equals to $\pm\pi/2$. This situation corresponds to drilling at the Earth poles that can not exist.

Therefore the initial azimuth can be determined using equation 15 by substituting the angular velocity output of the normal FOG, $\omega_y$, after removing the offset and the constant drift values. The residual errors in the measurements provided by this FOG, $\delta\omega_y$, affect the calculations of $\cos\psi$ and consequently the accuracy of the initial azimuth. The error in $\cos\psi$ due to these errors $\delta\omega_y$ can be obtained by differentiating equation 15:

$$\delta\cos\psi = \frac{\delta\omega_y}{\omega^e\cos\varphi} \quad (16)$$

It is crucial to remove the error $\delta\cos\psi$ from the $\cos\psi$ term calculated from equation 15 before proceeding to calculate the corresponding value of the azimuth $\psi$. This is necessary because of the inversely proportional relationship between the error in the azimuth $\delta\psi$ and the azimuth angle itself, $\psi$, which can be obtained from equation 16 as follows:

$$\delta\psi = \frac{\left(\frac{\delta\omega_y}{\omega^e\cos\varphi}\right)}{\sin\psi} \quad (17)$$

Since $\sin\psi \leq 1$, the term $(1/\sin\psi)$ in equation 17 tends to magnify the error $\delta\omega_y$. When $\psi$ is close to $\pi/2$, i.e. approaching the East direction, the term $1/\sin\psi$ becomes closer to unity and has minor effect on $\delta\psi$. On the other hand, when $\psi$ is close to 0, i.e. approaching the North direction, the term $1/\sin\psi$ magnifies the random error $\delta\psi$. In order to avoid this problem, the error term $\delta\cos\psi$ is determined first using equation 16 and removed from the values obtained for $\cos\psi$ using equation 15. Once an accurate estimation of $\cos\psi$ is determined, the azimuth can be computed independently from the drilling direction.

Once the initial azimuth of the bottom hole assembly is determined, the drill pipe can be rotated to achieve the desired azimuth direction. Although the normal FOG is responsible for the determination of the initial value of the azimuth, the toroidal FOG is responsible for the establishment of the desired azimuth direction.

With the BHA oriented along the vertical direction, the drill pipe is rotated along the tool spin axis until the desired azimuth direction is established. Rotation along the tool spin axis is preferably the only motion, either angular or translational, performed during this operation. Under these circumstances, the toroidal FOG monitors the rotation rate along the tool spin axis in addition to the component of Earth rotation along the vertical direction ($\omega^e\sin\phi$). Therefore, the time rate of change of the azimuth, $\dot\psi$, can be written as follows:

$$\dot\psi = \omega_z - \omega^e\sin\phi \quad (18)$$

where $\omega_z$ is the measurement delivered by the toroidal FOG.

Equation 18 is solved numerically in real-time to provide continuous monitoring of the azimuth angle while rotating the drill pipe. This first-order differential equation can be solved numerically using the Euler method [Yakowitz et al, 1989] after substituting $\dot\psi$ by $(\psi_{k+1} - \psi_k)/(\Delta t)$, where $\psi_{k+1}$ is the azimuth value at time $t_{k+1}$, $\psi_k$ is the azimuth value at time $t_k$ and $\Delta t = t_{k+1} - t_k$. Then, the azimuth can be continuously monitored using the following equation:

$$\psi_{k+1} = \psi_k + (\omega_z - \omega^e\sin\phi)\Delta t \quad (19)$$

As the drill pipe continuously rotates about its tool spin axis, the azimuth angle is continuously determined from equation 19. Once the desired azimuth direction is established, the rotation of the drill pipe is stopped and building the radical section of the well is initiated.

Surveying the Radical Section of the Well

Figure 10:
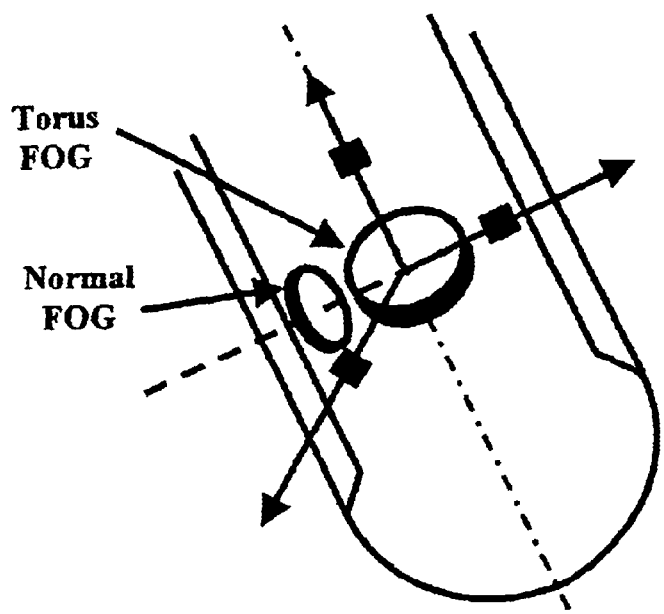
FIG. 10 shows the setup while surveying the radical section until 20° inclination.
Figure 11:
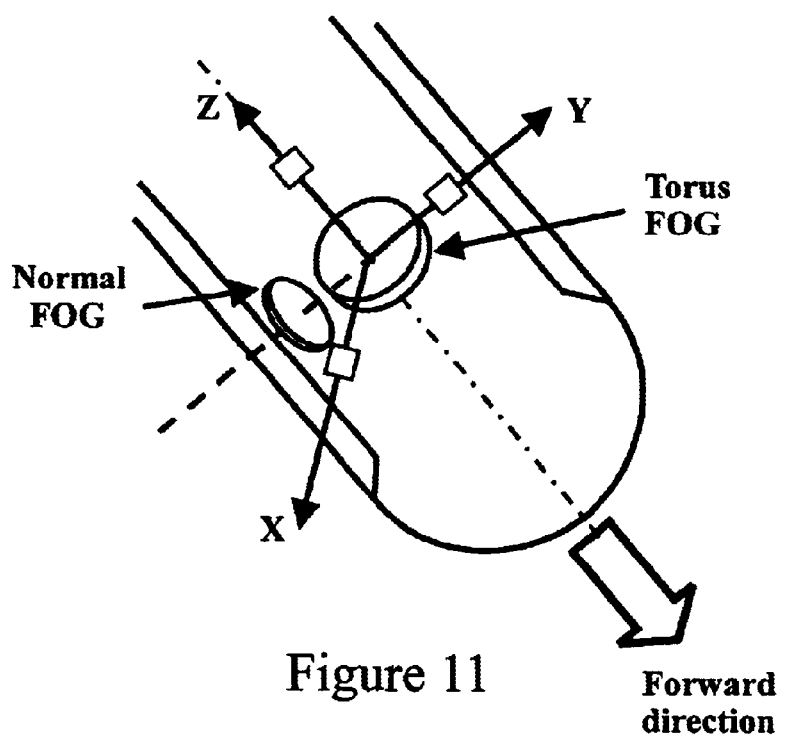
FIG. 11 shows the setup after achieving 20° inclination.
Figure 12:
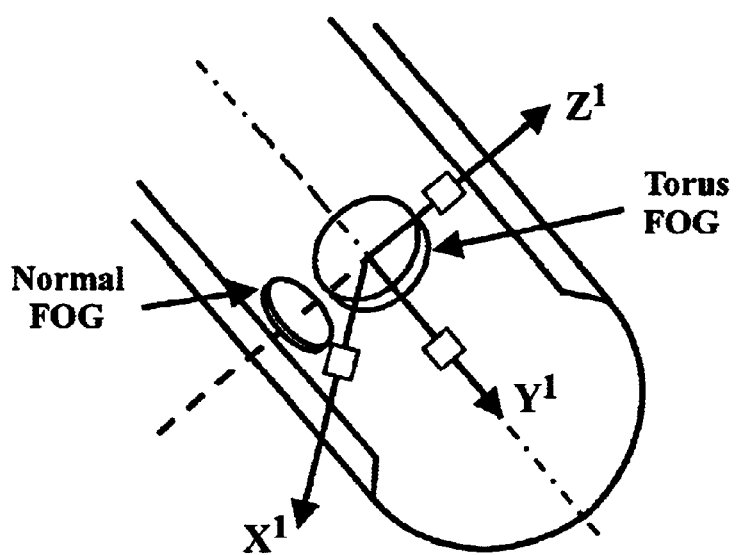
FIG. 12 shows the new axis orientation after 20° inclination.

During the building of the radical section of the well, the bottom hole assembly starts the drilling process from complete vertical direction and continues toward a complete horizontal direction. At the beginning, while the BHA is still in the vertical direction, the body frame axes are chosen as shown on FIG. 9. The X, Y, and Z axes point toward transverse, forward and vertical directions respectively. Therefore, the Z-axis points toward the tool spin axis. With this choice of axes orientation, we assume that the motion of the BHA is along the Y-axis, and sliding along the Z-axis (FIG. 10). Hence, the toroidal FOG monitors the changes in the azimuth angle $\psi$ while the normal FOG monitors the changes in the roll angle $\phi$. However, as the wellbore inclination increases, the Z-axis approaches the horizontal and the Y-axis approaches the vertical. The Y-axis is no longer in the forward direction and the Z-axis is no longer in the vertical direction. In addition, the toroidal FOG is no longer in the horizontal plane to successfully monitor the azimuth. Therefore, at a predetermined inclination such as 20°, a new orientation of the axes may be set to keep Y along the forward direction and Z along the vertical direction. This can be achieved by virtually choosing new axes system $X^1$, $Y^1$, and $Z^1$, as is illustrated in FIG. 12. $X^1$ points toward the transverse direction exactly like X while $Y^1$ points toward the forward direction (i.e. along the tool spin axis) and $Z^1$ points toward the vertical direction. This axes orientation is maintained until the end of the drilling process without any physical change in the mounting of the two FOGs.

In a preferred embodiment, there are two surveying methodologies for the radical section of the well. The first is applied during an initial portion of the radical section. As used herein, an "initial portion" is that portion of the well where the inclination is less than about 45°, preferably less than about 30° and more preferably less than about 20° inclination. The body frame is defined by the X, Y and Z axes as is shown in FIG. 10. During this initial portion of the well, the toroidal FOG (with its sensitive axis along the Z-axis) is responsible for monitoring the changes in the azimuth angle while the normal FOG (with its sensitive axis along the Y-axis) is responsible for monitoring the changes in the roll angle. Since the toroidal FOG monitors the rotation along the tool spin axis, the tool face angle is directly obtained from the toroidal FOG output.

After the initial portion, the tasks of the two FOGs are switched. In addition, the roll and the tool face angles become the same and are monitored by the toroidal FOG while the normal FOG monitors the changes in the azimuth angle.

Figure 13:
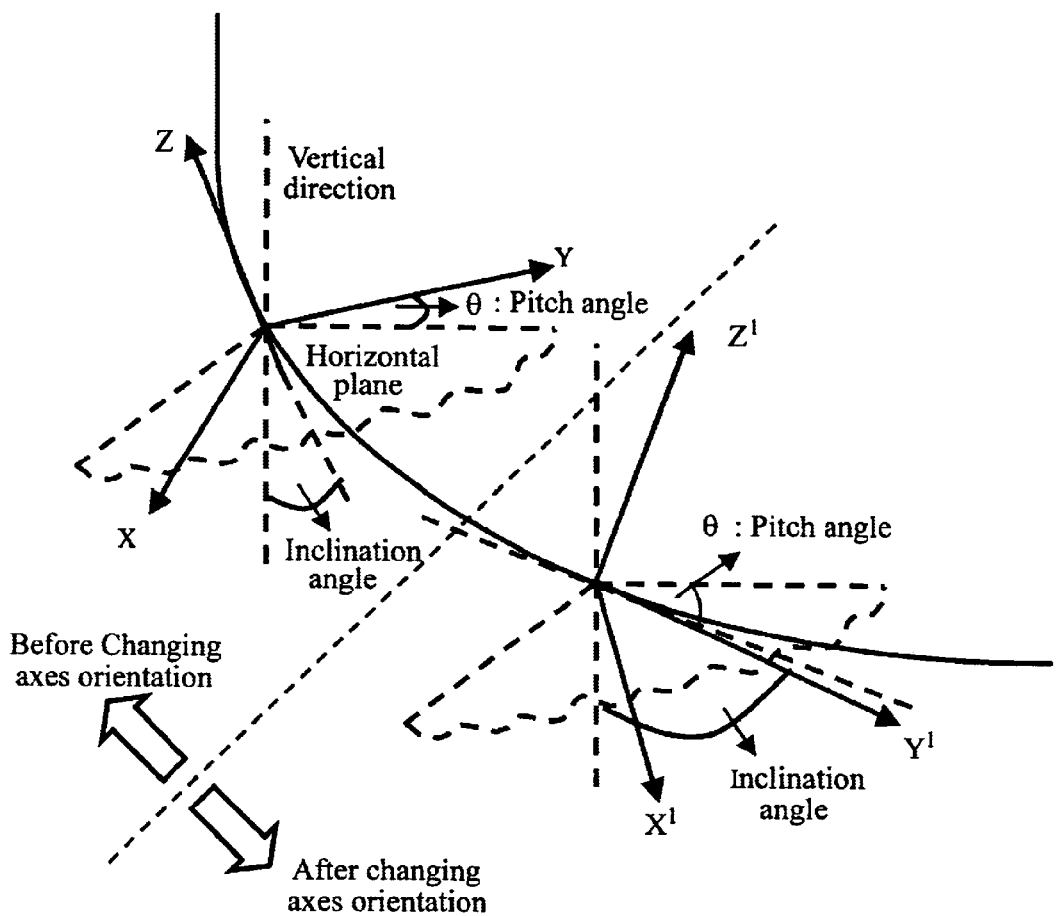
FIG. 13 shows the relationship between the pitch and the inclination angles before and after changing the axes orientation.

It should also be noted that the relationship between the pitch angle and the inclination angle is not the same for the two cases during and after the initial portion of the well. Before 20° inclination the pitch angle is equal to the inclination angle while after 20° inclination there is $\pi/2$ radians phase shift between them. This is because the pitch angle is defined as the angle between the forward direction (Y-axis) of the moving body and the horizontal plane (FIG. 13). Since the definition of the Y-axis is changed at 20° inclination, the definition of the pitch angle is changed accordingly and the $\pi/2$ radians phase shift is created between the inclination and the pitch angle.

The pitch angle is determined from the three-axis accelerometers. The determination of the inclination angle is based on the assumption that the three-axis accelerometers monitor the gravity components in three mutually orthogonal directions and their outputs can be integrated together to determine the pitch. This assumption is valid as long as the penetration rate through the downhole formation is relatively small. The average angle-building rate is about 4°/100 ft. for long-radius application, 12°/100 ft. for medium-radius applications and 4°/ft. for short-radius applications. In each of these three categories of horizontal drilling, the above assumption can be applied and the pitch can be determined from the measurements of the accelerometers.

Surveying the Radical Section Before 20° Inclination

The surveying technique explained in this sub section provides continuous surveying based on the measurements delivered by the three-axis accelerometers, the toroidal FOG and the normal FOG. The toroidal FOG determines the rotation rate along the Z-axis, $\omega_z$, while the normal FOG determines the rotation rate along the Y-axis, $\omega_y$. The rotation rate along the X-axis, $\omega_x$, can be determined from the time rate of change of the pitch angle. Therefore, the process starts with receiving the accelerometer measurements that can be combined to determine the pitch, which, until 20° inclination, is the same as the inclination angle. Based on the assumption of very small penetration rate through the downhole formation, we assumed that the three accelerometers are basically affected by the gravity field of the Earth only. Therefore, the accelerometer measurements taken at the body frame, $g^b$, are related to the gravity field of the Earth expressed in the l-frame, $g^l$, through the rotation matrix $R_l^b$ as follows:

$$g^b = \begin{pmatrix} f_x \\ f_y \\ f_z \end{pmatrix} = R_l^b g^l = \begin{pmatrix} \cos\psi\cos\phi - \sin\psi\sin\theta\sin\phi & \sin\psi\cos\phi + \cos\psi\sin\theta\sin\phi & -\cos\theta\sin\phi \\ -\sin\psi\cos\theta & \cos\psi\cos\theta & \sin\theta \\ \cos\psi\sin\phi + \sin\psi\sin\theta\cos\phi & \sin\psi\sin\phi - \cos\psi\sin\theta\cos\phi & \cos\theta\cos\phi \end{pmatrix} \begin{pmatrix} 0 \\ 0 \\ -\gamma \end{pmatrix} \quad (20)$$

where $f_x$, $f_y$ and $f_z$ are the measurements provided by the three mutually orthogonal accelerometers.

$\gamma$ is the value of gravity obtained from the normal gravity model given in equation 3.

From equation 20, the accelerometer measurements $f_x$, $f_y$ and $f_z$ can be given in terms of $\gamma$ as follows:

$$f_x = (\cos\theta \sin\phi)\gamma \quad (21)$$

$$f_y \times -(\sin\theta)\gamma \quad (22)$$

$$f_z = -(\cos\theta \cos\phi)\gamma \quad (23)$$

where $\theta$ is the pitch (inclination) angle and $\phi$ is the roll angle.

It is clear that the pitch angle can be obtained directly from equation 22 as long as $\gamma$ is determined from the normal gravity model (equation 3). The determination of $\gamma$ depends on the available information for the latitude $\phi$ and the altitude h. However, since the normal gravity model is an approximate model, and in order to prevent the propagation of errors, equations 21 through 23 are manipulated to remove the gravity term and to directly give the pitch angle. From equations 21 and 23, we can write $$\sqrt{f_x^2 + f_z^2} = (\cos\theta)\gamma \quad (24)$$

Then the pitch angle can be obtained by dividing equation 22 by equation 24.

$$\theta = \arctan\left(\sqrt{\frac{f_y^2}{f_x^2 + f_z^2}}\right) \quad (25)$$

Equation 25 gives the pitch angle directly in a way that is completely independent of the gravity field of the Earth. Then the rotation rate along the X-axis, $\omega_x$, is determined using the time rate of change of the pitch angle as follows:

$$\omega_x = \frac{\theta_{k+1} - \theta_k}{t_{k+1} - t_k} \quad (26)$$

where $\theta_k$ and $\theta_{k+1}$ are the values of the pitch angle at time $t_k$ and $t_{k+1}$ respectively.

The surveying procedure delivers the navigation data (the position and the orientation) for the bottom hole assembly by solving the set of first order differential equations given in equation 11. The first step in solving these equations is the parameterization of the rotation matrix $R_b^l$ [Schwarz et al., 1999; Salychev, 1998; Titterton et al., 1997]. One method for this purpose is the quaternion approach. According to Euler's Theorem [Salychev, 1998], the rotation of a rigid body (represented by the b-frame) with respect to a reference frame (represented by the l-frame) can be expressed in terms of the rotation angle $\Theta$ about a fixed axis and the direction cosine of the rotation axis that defines the rotation direction. Thus, quaternion parameters $Q=(q_1\ q_2\ q_3\ q_4)^T$ are introduced to describe the rotation of the b-frame with respect to the l-frame and they are expressed as follow:

$$Q = \begin{pmatrix} q_1 \\ q_2 \\ q_3 \\ q_4 \end{pmatrix} = \begin{pmatrix} (\Theta_x/\Theta)\sin(\Theta/2) \\ (\Theta_y/\Theta)\sin(\Theta/2) \\ (\Theta_z/\Theta)\sin(\Theta/2) \\ \cos(\Theta/2) \end{pmatrix} \quad (27)$$

where $\Theta = \sqrt{\Theta_x^2 + \Theta_y^2 + \Theta_z^2}$ is the rotation angle and $$\frac{\Theta_x}{\Theta}, \frac{\Theta_y}{\Theta}, \frac{\Theta_z}{\Theta}$$

are the three direction cosines of the rotation axis with respect to the l-frame.

The definition of the quaternion parameters described in equation (27) implies that the four quaternion components are not independent because $q_1^2 + q_2^2 + q_3^2 + q_4^2 = 1$. This means that only three independent quaternion components are sufficient to describe the rigid body rotation. The time rate of change of the quaternion is described by the following first-order differential equation:

$$\dot{Q} = \frac{1}{2}\Omega(\omega)Q \quad (28)$$

where $\Omega(\omega)$ is a skew-symmetric matrix given as follows:

$$\Omega(\omega) = \begin{pmatrix} 0 & \omega_z & -\omega_y & \omega_x \\ -\omega_z & 0 & \omega_x & \omega_y \\ \omega_y & -\omega_x & 0 & \omega_z \\ -\omega_x & -\omega_y & -\omega_z & 0 \end{pmatrix} \quad (29)$$

where $\omega_x, \omega_y, \omega_z$ are the angular velocities of body rotation which are determined by equation 26 for $\omega_x$ and are monitored by the normal FOG and the toroidal FOG for $\omega_y$ and $\omega_z$ respectively, after compensating for the Earth rotation and the l-frame change of orientation.

To solve the set of first order differential equations given in equation 28, Euler method can be used to determine the quaternion parameters $Q_{k+1}$ at time $t_{k+1}$ based on the values of the quaternion parameters $Q_k$ at time $t_k$ as follows:

$$Q_{k+1} = Q_k + \left(\frac{1}{2}\Omega(\omega_k)Q_k\right)\Delta t \quad (30)$$

where $\Delta t = t_{k+1} - t_k$.

Once the quaternion parameters are determined at certain time, the rotation matrix $R_b^l$ can be obtained using the following direct relationship:

$$R_b^l = \begin{pmatrix} R_{11} & R_{12} & R_{13} \\ R_{21} & R_{22} & R_{23} \\ R_{31} & R_{32} & R_{33} \end{pmatrix} = \quad (31)$$

$$\begin{pmatrix} q_1^2 - q_2^2 - q_3^2 + q_4^2 & 2(q_1 q_2 - q_3 q_4) & 2(q_1 q_3 + q_2 q_4) \\ 2(q_1 q_2 + q_3 q_4) & -q_1^2 + q_2^2 - q_3^2 + q_4^2 & 2(q_2 q_3 - q_1 q_4) \\ 2(q_1 q_3 - q_2 q_4) & 2(q_2 q_3 + q_1 q_4) & -q_1^2 - q_2^2 + q_3^2 + q_4^2 \end{pmatrix}$$

On the other hand, the quaternion parameters can be obtained from the rotation matrix $R_b^l$ as follows:

$$\begin{pmatrix} q_1 \\ q_2 \\ q_3 \\ q_4 \end{pmatrix} = \begin{pmatrix} 0.25(R_{32} - R_{23})/q_4 \\ 0.25(R_{13} - R_{31})/q_4 \\ 0.25(R_{21} - R_{12})/q_4 \\ 0.5\sqrt{1 + R_{11} + R_{22} + R_{33}} \end{pmatrix} \quad (32)$$

The quaternion parameters are introduced for the parameterization of the rotation matrix $R_b^l$ for three reasons. The first reason is that only four differential equations are solved numerically instead of six differential equations if we manipulate the rotation matrix $R_b^l$ directly. The second reason is that the quaternion solution avoids the singularity problem that might exist with some other solution methods. The third reason is the computational simplicity introduced by the quaternion.

One embodiment of the method may be described as follows:

1. Receive the measurements from the two FOGs and the three accelerometers. Some modern FOGs deliver angular increments at their output instead of rotation rate. Similarly, the accelerometers deliver velocity increments instead of specific force (acceleration) measurements. The angular changes provided by the two FOGs should be compensated for the drift rate d as follows:

$$\Delta\theta_y = \Delta\hat{\theta}_y - d_y \Delta t$$

$$\Delta\theta_z = \Delta\hat{\theta}_z - d_z \Delta t \quad (33)$$

where $\Delta\hat{\theta}_y$ is the raw measurement of the angular increments provided by the normal FOG;

$\Delta\theta_y$ is the measurement of the angular increments provided by the normal FOG after compensating for the drift rate $d_y$;

$\Delta\hat{\theta}_z$ is the raw measurement of the angular increments provided by the toroidal FOG;

$\Delta\theta_z$ is the measurement of the angular increments provided by the toroidal FOG after compensating for the drift rate $d_z$;

$\Delta t$ is the difference between the current time sample $t_{k+1}$ and the previous time sample $t_k$.

Similarly, the velocity increments provided by the accelerometers should be compensated for the bias terms b as follows:

$$\Delta v_x = \Delta\hat{v}_x - b_x \Delta t$$

$$\Delta v_y = \Delta\hat{v}_y - b_y \Delta t$$

$$\Delta v_z = \Delta\hat{v}_z - b_z \Delta t \quad (34)$$

where
- $\Delta \hat{v}_x$ is the raw measurement of the velocity increments provided by the accelerometer installed along the X-axis;
- $\Delta v_x$ is the measurement of the velocity increments provided by the accelerometer installed along the X-axis after compensating for the bias $b_x$;
- $\Delta \hat{v}_y$ is the raw measurement of the velocity increments provided by the accelerometer installed along the Y-axis;
- $\Delta v_y$ is the measurement of the velocity increments provided by the accelerometer installed along the Y-axis after compensating for the bias $b_y$;
- $\Delta \hat{v}_z$ is the raw measurement of the velocity increments provided by the accelerometer installed along the Z-axis;
- $\Delta v_z$ is the measurement of the velocity increments provided by the accelerometer installed along the Z-axis after compensating for the bias $b_z$;
- $\Delta t$ is the difference between the current time sample $t_{k+1}$ and the previous time sample $t_k$.

2. Determine the pitch angle from the accelerometer measurements as given in equation 25. This equation is slightly modified to suit the velocity increment output $\Delta v$ from the accelerometers. This modification is based on the direct relationship between the specific force measurement f, representing the acceleration, and the velocity increments $\Delta v$ given as $f=\Delta v/\Delta t$. Thus, the pitch angle, $\theta$, is determined as follows:

$$\theta = \arctan\left( \sqrt{\frac{\Delta v_y^2}{\Delta v_x^2 + \Delta v_z^2}} \right) \quad (35)$$

Then, the angular changes along X-direction, $\Delta \theta_x$, can be obtained from equation 26 as follows $$\Delta \theta_x = \omega_x \Delta t = [\theta(t_{k+1}) - \theta(t_k)] \quad (36)$$

3. Determine the effect of the Earth rotation and the l-frame change of orientation in the angular changes monitored along the three axes. The term responsible for the Earth rotation and the l-frame change of orientation is $\omega_{il}^b$ and is given as follows (see equation 10):

$$\omega_{il}^b = R_l^b(t_k) \begin{pmatrix} \dfrac{-V^n(t_k)}{M+h} \\ \dfrac{V^e(t_k)}{N+h} + \omega^e \cos\varphi \\ \dfrac{V^e(t_k)\tan\varphi}{N+h} + \omega^e \sin\varphi \end{pmatrix} \quad (37)$$

Then the angular changes corresponding to $\omega_{il}^b$ can be determined as:

$$\theta_{il}^b = \omega_{il}^b \Delta t \quad (38)$$

Consequently, the vector of measured angular increments $\theta_{ib}^b = (\Delta\theta_x\ \Delta\theta_y\ \Delta\theta_z)^T$ is compensated for $\theta_{il}^b$ to determine the actual bottom hole assembly angular changes $\theta_{lb}^b$ as follows:

$$\theta_{lb}^b = \theta_{ib}^b - \theta_{il}^b = (\delta\theta_x\ \delta\theta_y\ \delta\theta_z)^T \quad (39)$$

4. Update the quaternion. The time rate of change of the quaternion as given in equation 28 corresponds to the time rate of change of the rotation matrix $R_b^l$ as given in equation 7. The quaternion update follows equation 30. The time interval $\Delta t$ is multiplied by the elements of the skew-symmetric matrix of angular velocities $\Omega$, so that $\omega_x\Delta t=\delta\theta_x$, $\omega_y\Delta t=\delta\theta_y$, and $\omega_z\Delta t=\delta\theta_z$. The quaternion update equation is then given as follows:

$$\begin{pmatrix} q_1(t_{k+1}) \\ q_2(t_{k+1}) \\ q_3(t_{k+1}) \\ q_4(t_{k+1}) \end{pmatrix} = \begin{pmatrix} q_1(t_k) \\ q_2(t_k) \\ q_3(t_k) \\ q_4(t_k) \end{pmatrix} + \frac{1}{2}\begin{pmatrix} 0 & \delta\theta_z & -\delta\theta_y & \delta\theta_x \\ -\delta\theta_z & 0 & \delta\theta_x & \delta\theta_y \\ \delta\theta_y & -\delta\theta_x & 0 & \delta\theta_z \\ -\delta\theta_x & -\delta\theta_y & -\delta\theta_z & 0 \end{pmatrix}\begin{pmatrix} q_1(t_k) \\ q_2(t_k) \\ q_3(t_k) \\ q_4(t_k) \end{pmatrix} \quad (40)$$

where the initial value of the quaternion $Q(t_0)=(q_1(t_0)\ q_2(t_0)\ q_3(t_0)\ q_4(t_0))$ is chosen to be equal to $(0\ 0\ 0\ 1)^T$.

Consequently, the rotation matrix $R_b^l$ can be determined from its direct relationship to the quaternion $Q = (q_1\ q_2\ q_3\ q_4)^T$ as given by equation 31. From the Re definition given in equation 1, the pitch (inclination) is determined as $\theta=\arcsin(R_{32})$, the roll is determined as $\phi\ \arctan(-R_{31}/R_{33})$ and the azimuth (tool face) is determined as $\psi=\arctan(-R_{12}/R_{22})$ 5. Determine the changes in velocity of the bottom hole assembly using equation 4 that describes the time rate of change of the velocity of the bottom hole assembly expressed in the l-frame. This equation can be rewritten as follows:

$$\frac{\Delta V^l}{\Delta t} = R_b^l f^b - (2\Omega_{ie}^l + \Omega_{el}^l)V^l + g^l$$

or $$\Delta V^l = R_b^l f^b \Delta t - (2\ \Omega_{ie}^l + \Omega_{el}^l)V^l\Delta t + g^l\Delta t \quad (41)$$

Since the specific force measurement $f^b=(f_x\ f_y\ f_z)^T$ is related to the velocity increment measurements $\Delta v^b=(\Delta v_x\ \Delta v_y\ \Delta v_z)^T$ with $f^b=\Delta v^b\Delta t$, equation 41 can be given as:

$$\Delta V^l(t_{k+1})=R_b^l\Delta v^b(t_{k+1})-(2\ \Omega_{ie}^l+\Omega_{el}^l)V^l(t_k)\Delta t+g^l\Delta t \quad (42)$$

where $\Omega_{ie}^l$ and $\Omega_{el}^l$ are given in equations 5 and 6 respectively, while $g^l$ is the gravity field vector and is defined as shown in equation 3.

The first term on the right-hand side of equation 42 is the measured velocity increments transformed to the l-frame. The second term is the Coriolis correction that compensates for the Earth rotation and the l-frame change of orientation. The third tem is the gravity correction.

The velocity components at the current time epoch $t_{k+1}$ are computed using the modified Euler formula as follows:

$$V^l(t_{k+1}) = V^l(t_k) + \frac{1}{2}(\Delta V^l(t_k) + \Delta V^l(t_{k+1})) \quad (43)$$

where $V^l=(V^e\ V^n\ V^u)$ are the velocity components as described in the l-frame.

6. Determine the altitude of the bottom hole assembly, h, (i.e. the true vertical depth TVD) using the vertical component of the velocity vector, $V^u$. Since h=$V^u$ accord ing to equation 2, the TVD can be computed at time instant $t_{k+1}$ using the modified Euler formula as follows:

$$h(t_{k+1}) = h(t_k) + \frac{1}{2}(V^u(t_{k+1}) + V^u(t_k))\Delta t \qquad (44)$$

Once the TVD is determined, the latitude φ, and the longitude λ, can be computed. According to equation 2, φ and λ can be computed at time instant ($t_{k+1}$) using the modified Euler formula as follows:

$$\varphi(t_{k+1}) = \varphi(t_k) + \frac{1}{2}\frac{(V^n(t_{k+1}) + V^n(t_k))}{M + h}\Delta t \qquad (45)$$

$$\lambda(t_{k+1}) = \lambda(t_k) + \frac{1}{2}\frac{(V^e(t_{k+1}) + V^e(t_k))}{(N + h)\cos\varphi}\Delta t \qquad (46)$$

It should be noted that the computation of the longitude, λ, will suffer from singularities if this procedure is performed closer to the poles where the latitude φ becomes equal to π/2.

Figure 14:
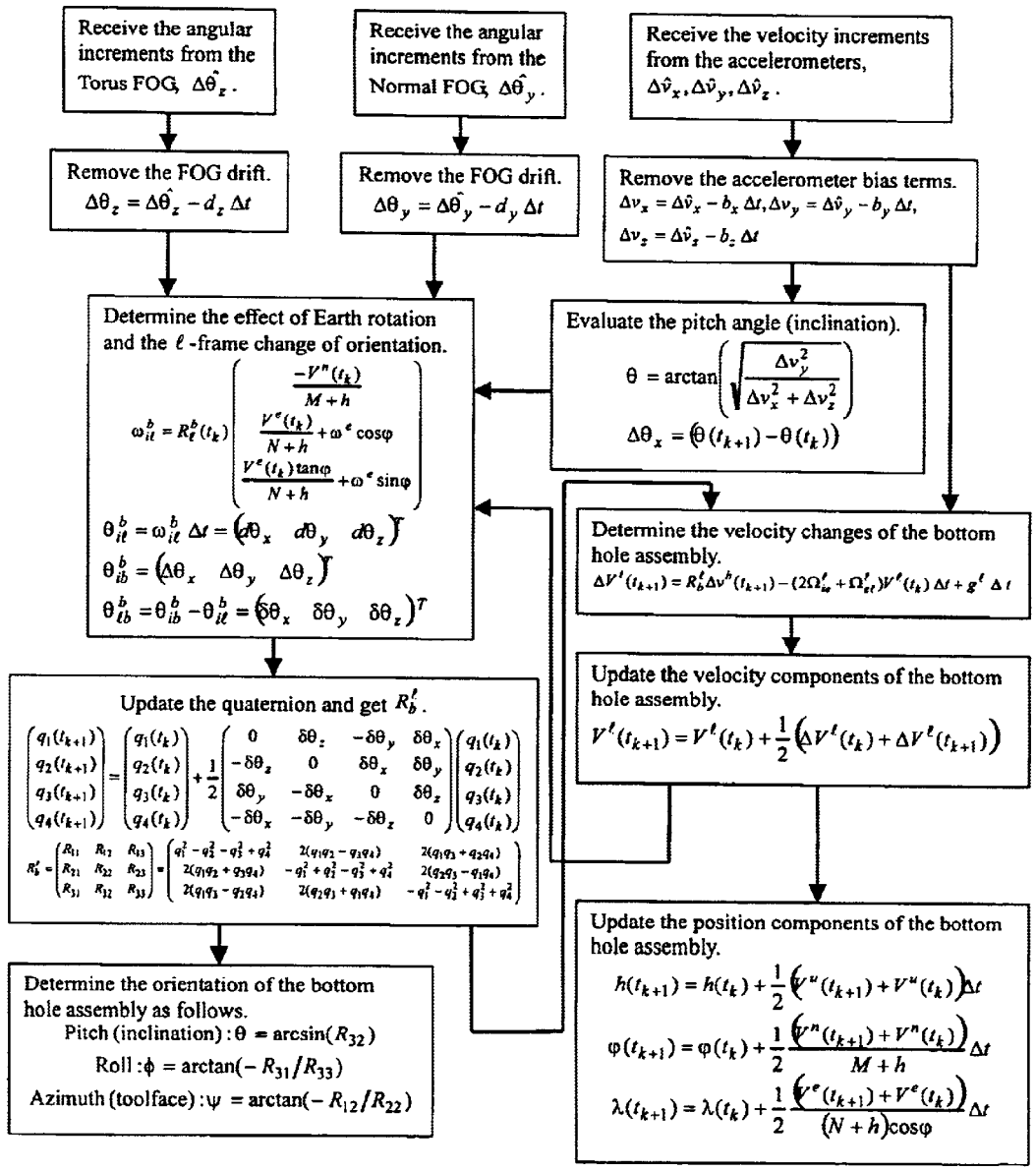
FIG. 14 is a block diagram describing the functionality of the surveying procedure until 20° inclination.

The six steps described above are repeated for each new set of measurements received from the two FOGs and the three accelerometers until 20° inclination. A block diagram describing the functionality of this procedure is shown on FIG. 14.

Figure 14A:
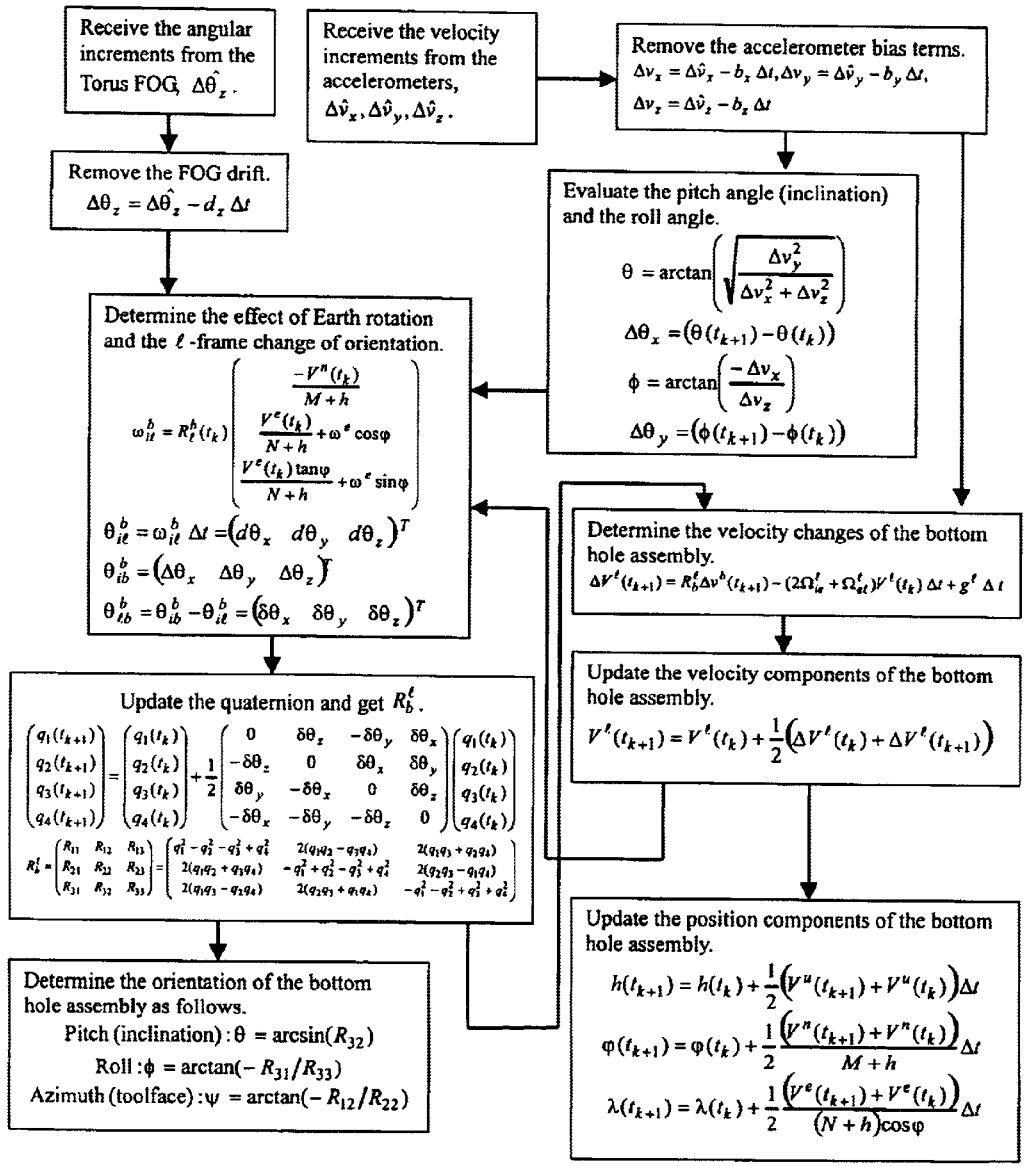
FIG. 14A is a block diagram describing the functionality of the surveying procedure until 20° inclination using only the toroidal FOG.

In an alternative embodiment of the invention, surveying may be accomplished with only the toroidal FOG and the three accelerometers until 20° inclination. A block diagram describing the functionality of this procedure is shown in FIG. 14A. In this case, the toroidal FOG may monitor both azimuth and roll angles because of the near verticality of the BHA. As the pitch angle increases, the unity between azimuth and roll decreases and the ability of the toroidal FOG to monitor roll angle diminishes.

Surveying the Radical Section After 20° Inclination

As shown earlier on FIG. 13, change of axes orientation may take place at 20° inclination in one embodiment of the invention. The $Y^1$-axis is now oriented along the tool spin axis while $Z^1$-axis is oriented along the orthogonal direction. The $X^1$-axis remains collinear to the old X-axis. The initial values for the navigation parameters (position components, velocity components and attitude components) for surveying this part of the radical section of the well can be obtained from the last values determined just before changing the axes orientation. It should be reiterated that the location of the two FOGs and the accelerometers would not physically change due to the change of axes orientation. Once the procedure for the first part of the radical section of the well (before 20° inclination) indicates an inclination of 20°, the output of the toroidal FOG is interpreted as $\Delta\hat{\theta}_y$, since its sensitive axis is reoriented along $Y^1$-axis. Similarly, the output of the normal FOG is interpreted as $\Delta\hat{\theta}_z$ since its sensitive axis is reoriented along the $Z^1$-axis (see FIG. 12). In addition, the output of the accelerometer installed along the tool spin axis ($Y^1$-axis) is interpreted as $\Delta\hat{v}_y$ instead of $\Delta\hat{v}_z$ while the output of the accelerometer installed along the orthogonal direction ($Z^1$-axis) is interpreted as $\Delta\hat{v}_z$ instead of $\Delta\hat{v}_y$. The third accelerometer installed along the $X^1$-axis has its output interpreted as $\Delta\hat{v}_x$ the same as in the first part of the drilling of the radical section of the well.

Figure 15:
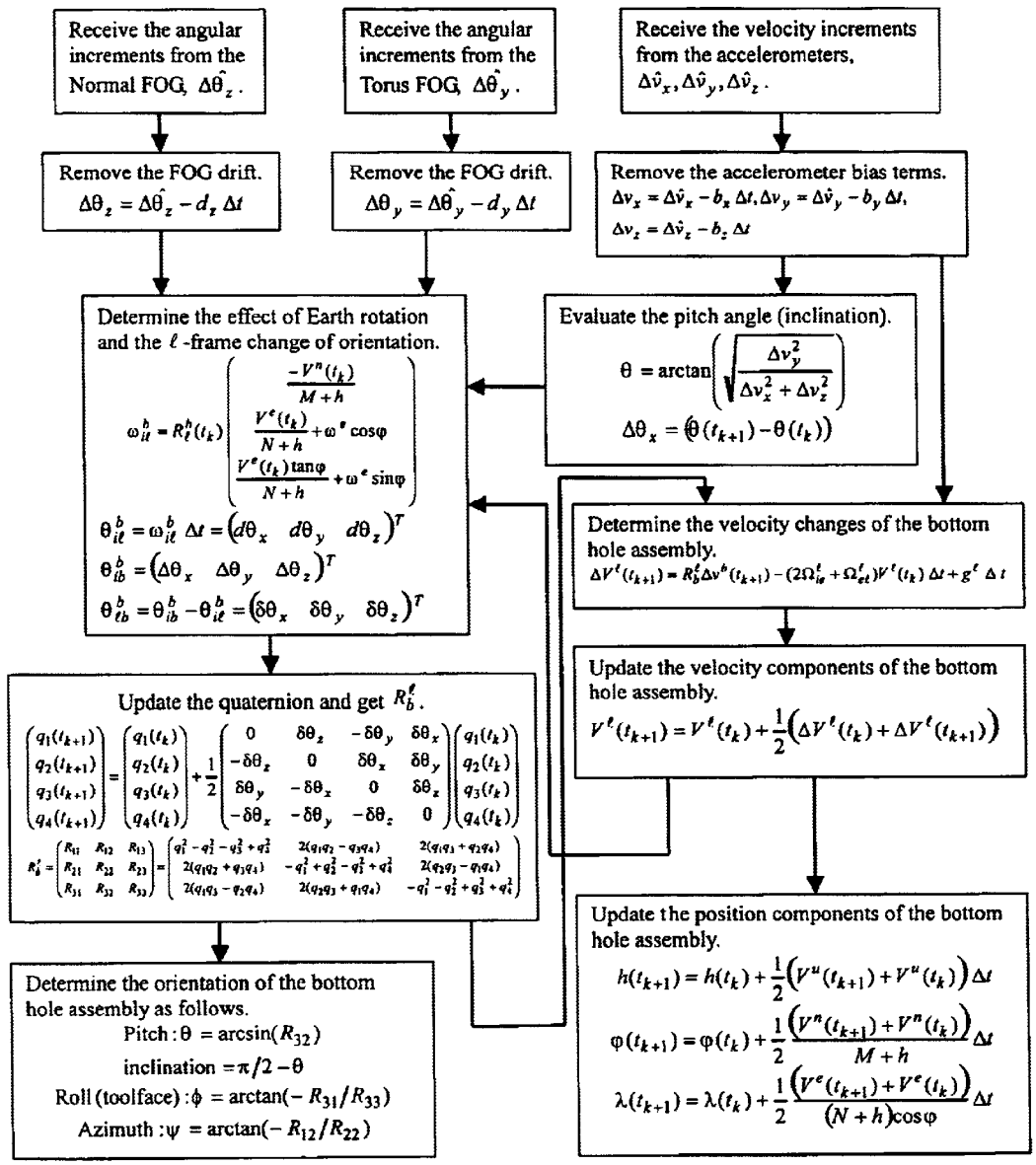
FIG. 15 is a block diagram describing the functionality of the surveying procedure after 20° inclination.

The navigation procedure for this part of the radical section of the well is exactly the same as the procedure described in the previous section except for three changes. The first change is the different interpretation of the measurements provided by the two FOGs and the three accelerometers. The second change is that the tool face angle becomes no longer equivalent to the azimuth. Instead, it becomes equivalent to the roll. The third change is that the inclination is no longer equivalent to the pitch (θ) and is given as π/2–θ. The navigation procedure for surveying after 20° inclination is shown schematically in the block diagram shown as FIG. 15.

Figure 16:
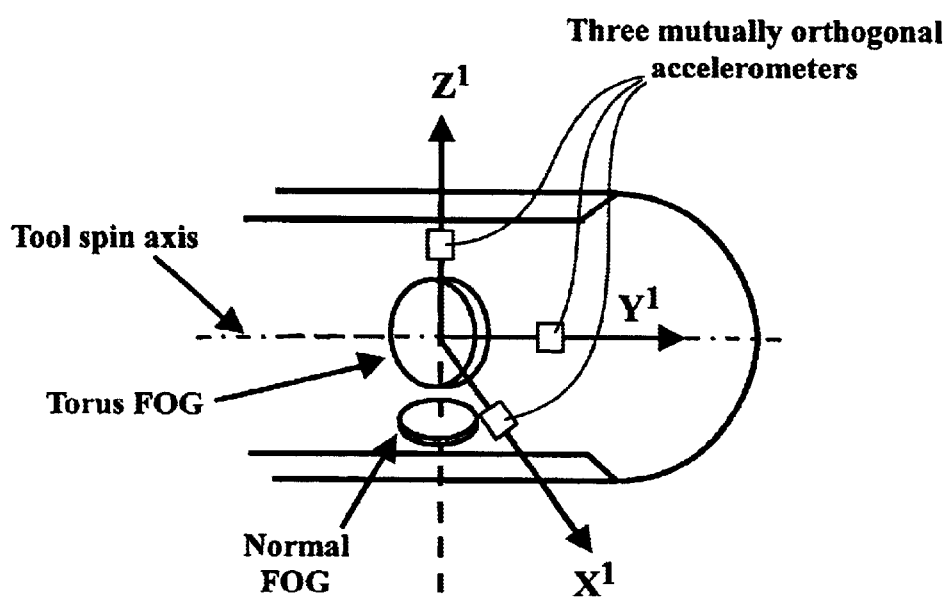
FIG. 16 shows the arrangement of the surveying instruments inside the bottom hole assembly while drilling the horizontal section of the well.

Surveying the Horizontal Section of the Well:

Surveying the horizontal section of the well is different from the radical section due to the rotary mode of drilling during which the whole drill pipe starts to continuously rotate about its spin axis. Therefore, continuous surveying can no longer be performed and station-based surveying procedure should be prepared. The station-based surveying is based on stopping the drilling operation at certain survey stations. Since the surveying setup is completely stationary at each station, the two FOGs are affected by the Earth rotation rate and the three accelerometers are affected by the Earth gravity field. The arrangement of the surveying instruments inside the bottom hole assembly is shown on FIG. 16. The relationship between the Earth rotation rate vector monitored by the FOGs and the same vector defined at the l-frame is given using the rotation matrix $R_l^b$ as follows:

$$\omega_{ie}^b = \begin{pmatrix} \omega_x \\ \omega_y \\ \omega_z \end{pmatrix} = R_l^b \omega_{ie}^l = \begin{pmatrix} \cos\psi\cos\phi - \sin\psi\sin\theta\sin\phi & \sin\psi\cos\phi + \cos\psi\sin\theta\sin\phi & -\cos\theta\sin\phi \\ -\sin\psi\cos\theta & \cos\psi\cos\theta & \sin\theta \\ \cos\psi\sin\phi + \sin\psi\sin\theta\cos\phi & \sin\psi\sin\phi - \cos\psi\sin\theta\cos\phi & \cos\theta\cos\phi \end{pmatrix} \begin{pmatrix} 0 \\ \omega^e\cos\varphi \\ \omega^e\sin\varphi \end{pmatrix} \qquad (47)$$

The angular velocity $\omega_y$ is monitored by the toroidal FOG and can be obtained from the corresponding angular increment output as follows:

$$\omega_y = \frac{\Delta\theta_y}{\Delta t} \qquad (48)$$

The component of the Earth rotation rate monitored by the toroidal FOG can be obtained from equation (47) and written as:

$$\omega_y = (\cos\psi\cos\theta)\omega^e\cos\varphi + (\sin\theta)\omega^e\sin\varphi \qquad (49)$$

This equation is similar to equation 13 for the establishment of the desired azimuth direction. The only difference is that the angular velocity measurement, $\omega_y$, is provided by the toroidal FOG instead of the normal FOG. With simple mathematical manipulation, equation 49 can be rewritten as:

$$\cos\psi = \frac{\frac{\omega_y}{\omega^e\cos\varphi} - \sin\theta\tan\varphi}{\cos\theta} \qquad (50)$$

Since the drilling process for this section of the well is along the horizontal plane, we can assume that the pitch angle is equal to zero and equation 50 can be simplified. However, general solution is presented in this section to suit a special case that might exist while drilling the radical section of the well. This case involves drilling some parts of the radical section with rotary mode of drilling instead of utilizing the steering mode. In this special case the pitch angle cannot be assumed equal to zero.

To determine the azimuth angle from equation 50, the pitch angle, $\theta$, should be computed. Moreover, complete station based surveying requires the determination of the inclination angle ($\pi/2-\theta$) and the tool face angle (the roll angle, $\phi$). This information is determined by manipulating the accelerometer measurements. The accelerometer measurements $(f_x\ f_y\ f_z)^T$ are related to the Earth gravity filed through the rotation matrix $R_l^b$. This relationship can be written as:

$$g^b = \begin{pmatrix} f_x \\ f_y \\ f_z \end{pmatrix} = R_l^b g^l = \begin{pmatrix} \cos\psi\cos\phi - \sin\psi\sin\theta\sin\phi & \sin\psi\cos\phi + \cos\psi\sin\theta\sin\phi & -\cos\theta\sin\phi \\ -\sin\psi\cos\theta & \cos\psi\cos\theta & \sin\theta \\ \cos\psi\sin\phi + \sin\psi\sin\theta\cos\phi & \sin\psi\sin\phi - \cos\psi\sin\theta\cos\phi & \cos\theta\cos\phi \end{pmatrix} \begin{pmatrix} 0 \\ 0 \\ -\gamma \end{pmatrix} \quad (51)$$

The expressions for $f_x$, $f_y$ and $f_z$ can be expressed in terms of the pitch and the roll angles by manipulating equation 51 as follows:

$$f_x = (\cos\theta\sin\phi)\gamma \quad (52)$$

$$f_y = -(\sin\theta)\gamma \quad (53)$$

$$f_z = -(\cos\theta\cos\phi)\gamma \quad (54)$$

From equations (52–54) the pitch and the roll angles can be expresses as:

$$\theta = \arctan\left(\sqrt{\frac{f_y^2}{f_x^2 + f_z^2}}\right) \quad (55)$$

$$\phi = \arctan\left(-\frac{f_x}{f_z}\right) \quad (56)$$

The specific force measurements $f_x$, $f_y$ and $f_z$ are obtained from the velocity increment outputs of the accelerometers $\Delta v_x$, $\Delta v_y$ and $\Delta v_z$ as follows:

$$f_x = \frac{\Delta v_x}{\Delta t}, f_y = \frac{\Delta v_y}{\Delta t}, f_z = \frac{\Delta v_z}{\Delta t} \quad (57)$$

Therefore, station-based surveying during the horizontal section of the well delivers only the orientation of the bottom hole assembly using equations 50, 55 and 56 to provide the azimuth, the pitch and the roll respectively. The inclination is then equal to $\pi/2-\theta$ and the tool face is exactly the roll.

Error Analysis for the Station-Based Surveying:

Although the measurements from the toroidal FOG and the accelerometers are compensated for all bias terms, there are still some residual errors that affect the accuracy of the attitude angles. These residual errors include the cross-axis sensitivity, the bias calibration error, the bias temperature shift, and the scale factor calibration error. Some typical values are assigned to these errors and they are defined by the manufacturer.

The error components in the specific force measurements can be obtained by differentiating equations 52, 53 and 54.

$$\delta f_x = (-\sin\theta\sin\phi\delta\theta + \cos\theta\cos\phi\delta\phi)\gamma \quad (58)$$

$$\delta f_y = -(\cos\theta\delta\theta)\gamma \quad (59)$$

$$\delta f_z = (\sin\theta\cos\phi\delta\theta + \cos\theta\sin\phi\delta\phi)\gamma \quad (60)$$

The error in the pitch angle, $\delta\theta$, can be obtained from equation 59 and is expressed as follows:

$$\delta\theta = -\frac{\left(\frac{\delta f_y}{\gamma}\right)}{\cos\theta} \quad (61)$$

Using equations 58 and 60, $(\delta f_x)^2 + (\delta f_z)^2$ can be given as follows:

$$(\delta f_x)^2 + (\delta f_z)^2 = (\sin^2\theta(\delta\theta)^2 + \cos^2\theta(\delta\phi)^2)\gamma^2 \quad (62)$$

Equation (62) can be manipulated with the substitution of the error in the pitch angle from equation (61) to give the error in the roll angle $\delta\phi$ as follows:

$$\delta\phi = \frac{\left(\frac{\sqrt{\delta f_x^2 + \delta f_z^2 - \delta f_y^2 \tan^2\theta}}{\gamma}\right)}{\cos\theta} \quad (63)$$

The errors in both the pitch and the roll are determined from equations 61 and 63 and are used to correct the values of the pitch and the roll angles obtained by equations 55 and 56. The correct value of the pitch angle is then used in equation 50 to determine the azimuth. However, any residual errors existing in the toroidal FOG affect the azimuth accuracy. The azimuth error can be determined from equation 49. If this equation is differentiated with the assumption that the pitch angle is free from error, the toroidal FOG error can be expressed as:

$$\delta\omega_y = \delta(\cos\psi)\cos\theta(\omega^e\cos\phi) \quad (64)$$

Then the error term $\delta(\cos\psi)$ can be written as $$\delta(\cos\psi) = \frac{\left(\frac{\delta\omega_y}{(\omega^e\cos\varphi)}\right)}{\cos\theta} \quad (65)$$

As discussed above regarding the establishment of the desired azimuth direction, the error in the $\cos\psi$ term should be determined using equation 65 and completely removed before the value of the azimuth angle is computed. This is to avoid the magnification of the azimuth error if calculated directly as follows:

$$\delta\psi = -\frac{\left(\frac{\delta\omega_y}{(\omega^e\cos\varphi)}\right)}{\cos\theta} \cdot \frac{1}{\sin\psi} \quad (66)$$

It can be inferred from equation 66 that the term $1/\sin\psi$ largely magnifies the azimuth error, $\delta\psi$, as the bottom hole assembly approaches the North-South direction (i.e. when $\psi\approx 0$). In addition, singularity problems exist in the calculation of $\delta\psi$ if $\delta=0$. Therefore, to avoid all these problems, the error term $\delta(\cos\psi)$ is computed prior to determining the azimuth.

Figure 17:
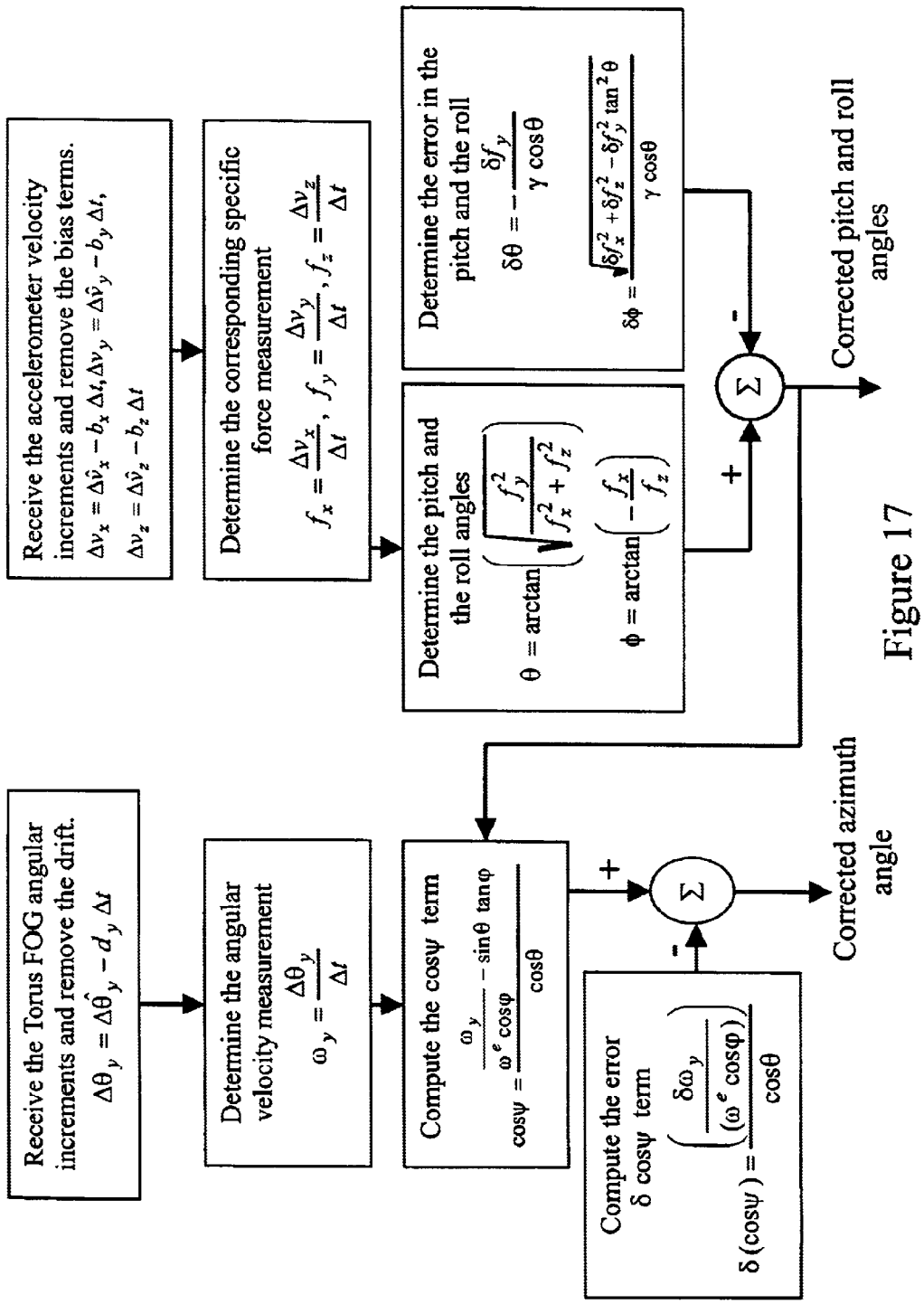
FIG. 17 is a block diagram showing the station-based surveying procedure.

The whole station-based surveying procedure can be shown as a block diagram in FIG. 17. It should be mentioned that this procedure gives coarse computation of the attitude angles. Precise computation should be applied to improve the estimation accuracy. The technique for precise computation is described in the following sections.

Error Analysis of the Motion of the Bottom Hole Assembly

In practical systems employing the technology of strapdown inertial navigation the accuracy is limited by the errors originating in the raw measurements as well as by the imperfections in the various components which are combined to build the system. These error sources are categorized as inertial sensor errors and computational errors [Stephenson et al., 1992; Schwarz et al., 1990]. Any lack of precision in the measurements of an inertial navigation system is passed from one estimate to the next with the overall uncertainty in the precision of the estimated quantity drifting with time. This explains why the accuracy of the INS deteriorates in the long term. For MWD surveying, the drilling process continues for several hours. Therefore, error models are required for analysis and estimation of the various error sources associated with the inertial system proposed in the previous section.

Errors in dynamic systems are variable in time and therefore described by differential equations. Linearization of the non-linear dynamic system is the most common approach for deriving a set of linear differential equations which define the error states of the dynamic system. The error states expressed in the t-frame for the mechanization equations given in the previous section are defined as follows:

$$e^l = (\delta\phi, \delta\lambda, \delta h, \delta V_e, \delta V_n, \delta V_u, \delta\theta, \delta\phi, \delta\psi, \delta\omega_x, \delta\omega_y, \delta\omega_z, \delta f_x, \delta f_y, \delta f_z) \quad (67)$$

where
$\delta\phi, \delta\lambda, \delta h$ are the coordinate errors;
$\delta V^e, \delta V^n, \delta V^u$ are the velocity errors;
$\delta\theta, \delta\phi, \delta\psi$ are the attitude errors;
$\delta\omega_x, \delta\omega_y, \delta\omega_z$ are the errors in the angular velocity measurements;
$\delta f_x, \delta f_y, \delta f_z$ are the errors in the specific force measurements.

Attitude Errors

The attitude errors are defined as the misalignment due to the orthogonal transformation between the b-frame and the l-frame. These errors ($\delta\theta$, $\delta\phi$ and $\delta\psi$) depend on two main sources. The first source are the errors in the measurement of angular velocities provided by the FOGs. The second source are the errors generated due to the Earth rotation and the change of orientation of the l-frame. The expression describing the time rate of change of the attitude errors is given as follows:

$$\dot{\epsilon}^l = -\Omega_{il}^l \epsilon^l - \delta\omega_{il}^l + R_b^l d \quad (68)$$

where $\epsilon^l = (\delta\theta \; \delta\phi \; \delta\omega)^T$ is the attitude error;

$\Omega_{il}^l = \Omega_{ie}^l + \Omega_{el}^l$ is the skew symmetric matrix for the rotation of the l-frame with respect to the i-frame;

$\delta\omega_{il}^l = \delta\omega_{ie}^l + \delta\omega_{el}^l$ is the angular velocity error vector corresponding to $\omega_{il}^l$;

$d = (\delta\omega_x \; \delta\omega_y \; \delta\omega_z)^T$ is the vector of angular velocities measurement errors (FOG drift rates).

The second term in the right hand side of equation 68, $\delta\omega_{il}^l$, depends implicitly on the velocity errors $\delta V^l = (\delta V^e \delta V^n \delta V^u)^T$ and the coordinate errors $\delta r^l = (\delta\phi \; \delta\lambda \; \delta h)^T$. This angular velocity error consists of two terms, $\delta\omega_{ie}^l$ and $\delta\omega_{el}^l$, which are given as:

$$\delta\omega_{ie}^l = \begin{pmatrix} 0 & 0 & 0 \\ -\omega^e \sin\varphi & 0 & 0 \\ \omega^e \cos\varphi & 0 & 0 \end{pmatrix} \begin{pmatrix} \delta\varphi \\ \delta\lambda \\ \delta h \end{pmatrix} \quad (69)$$

$$\delta\omega_{el}^l = \begin{pmatrix} 0 & 0 & \dfrac{V^n}{(M+h)^2} \\ 0 & 0 & \dfrac{-V^e}{(N+h)^2} \\ \dfrac{V^e}{(N+h)\cos^2\varphi} & 0 & \dfrac{-V^e \tan\varphi}{(N+h)^2} \end{pmatrix} \begin{pmatrix} \delta\varphi \\ \delta\lambda \\ \delta h \end{pmatrix} + \begin{pmatrix} 0 & \dfrac{-1}{M+h} & 0 \\ \dfrac{1}{N+h} & 0 & 0 \\ \dfrac{\tan\varphi}{N+h} & 0 & 0 \end{pmatrix} \begin{pmatrix} \delta V^e \\ \delta V^n \\ \delta V^u \end{pmatrix} \quad (70)$$

With the substitution of the expressions of $\delta\omega_{ie}^l$ (equation 69) and $\delta\omega_{el}^l$ (equation 70), the attitude error equation (equation 68) can be rewritten as:

$$\begin{pmatrix} \delta\dot\theta \\ \delta\dot\phi \\ \delta\dot\psi \end{pmatrix} = \begin{pmatrix} 0 & \omega^e \sin\varphi + \dfrac{V^e \tan\varphi}{N+h} & -\omega^e \cos\varphi - \dfrac{V^e}{N+h} \\ -\omega^e \sin\varphi - \dfrac{V^e \tan\varphi}{N+h} & 0 & -\dfrac{V^n}{M+h} \\ \omega^e \cos\varphi + \dfrac{V^e}{N+h} & \dfrac{V^n}{M+h} & 0 \end{pmatrix} \begin{pmatrix} \delta\theta \\ \delta\phi \\ \delta\psi \end{pmatrix} + \quad (71)$$

$$\begin{pmatrix} 0 & 0 & \dfrac{-V^n}{(M+h)^2} \\ \omega^e \sin\varphi & 0 & \dfrac{V^e}{(N+h)^2} \\ -\omega^e \cos\varphi - \dfrac{V^e}{(N+h)\cos^2\varphi} & 0 & \dfrac{V^e \tan\varphi}{(N+h)^2} \end{pmatrix} \begin{pmatrix} \delta\varphi \\ \delta\lambda \\ \delta h \end{pmatrix} +$$

$$\begin{pmatrix} 0 & \frac{1}{M+h} & 0 \\ \frac{-1}{N+h} & 0 & 0 \\ \frac{-\tan\varphi}{N+h} & 0 & 0 \end{pmatrix} \begin{pmatrix} \delta V^e \\ \delta V^n \\ \delta V^u \end{pmatrix} + R_b^l d$$

Coordinate Errors:

Since the coordinates of the bottom hole assembly depend only on the velocity components $V^e$, $V^n$ and $V^u$, the coordinate errors $\delta\phi$, $\delta\lambda$ and $\delta h$ are given directly in terms of velocity errors $\delta V^e$, $\delta V^n$ and $\delta V^u$. The expression for the coordinate errors is obtained by differentiating both sides of equation 2 that describes the relationship between the time rate of change of the coordinate components and the velocity components. Since this relationship is given by the matrix $D^{-1}$ with its elements depending on the coordinate components $\phi$ and h, the coordinate errors $\delta\phi$, $\delta\lambda$ and $\delta h$ are written as follows:

$$\delta \dot{p}^l = \begin{pmatrix} 0 & \frac{1}{M+h} & 0 \\ \frac{1}{(N+h)\cos\varphi} & 0 & 0 \\ 0 & 0 & 1 \end{pmatrix} \begin{pmatrix} \delta V^e \\ \delta V^n \\ \delta V^u \end{pmatrix} + \begin{pmatrix} 0 & 0 & \frac{-V^n}{(M+h)^2} \\ \frac{V^e \tan\varphi}{(N+h)\cos\varphi} & 0 & \frac{-V^e}{(N+h)^2\cos\varphi} \\ 0 & 0 & 0 \end{pmatrix} \begin{pmatrix} \delta\varphi \\ \delta\lambda \\ \delta h \end{pmatrix} \quad (72)$$

Velocity Errors:

The complete implementation of the l-frame mechanization equations requires the computation of the three velocity components $V^e$, $V^n$ and $V^u$ using equation 4. The corresponding error equations are obtained by differentiating equation 4 and are given as:

$$\begin{pmatrix} \delta \dot{V}^e \\ \delta \dot{V}^n \\ \delta \dot{V}^u \end{pmatrix} = \begin{pmatrix} (2\omega^e \sin\varphi)V^u + (2\omega^e \cos\varphi)V^n + \frac{V^n V^e}{(N+h)\cos^2\varphi} & 0 & 0 \\ (-2\omega^e \cos\varphi)V^e - \frac{(V^e)^2}{(N+h)\cos^2\varphi} & 0 & 0 \\ (-2\omega^e \sin\varphi)V^e & 0 & \frac{2\gamma}{R} \end{pmatrix} \begin{pmatrix} \delta\varphi \\ \delta\lambda \\ \delta h \end{pmatrix} + \quad (73)$$

$$\begin{pmatrix} 0 & f_u & -f_n \\ -f_u & 0 & f_e \\ f_n & -f_e & 0 \end{pmatrix} \begin{pmatrix} \delta\theta \\ \delta\phi \\ \delta\psi \end{pmatrix} +$$

$$\begin{pmatrix} \frac{-V_u}{N+h} + \frac{V_n}{N+h}\tan\varphi & 2\omega^e \sin\varphi + \frac{V^e \tan\varphi}{(N+h)} & -2\omega^e \cos\varphi - \frac{V^e}{N+h} \\ -2\omega^e \sin\varphi - \frac{2V^e \tan\varphi}{N+h} & -\frac{V^u}{M+h} & \frac{-V_n}{M+h} \\ 2\omega^e \cos\varphi + \frac{2V^e}{N+h} & \frac{2V^n}{M+h} & 0 \end{pmatrix} \begin{pmatrix} \delta V^e \\ \delta V^n \\ \delta V^u \end{pmatrix} +$$

$$R_b^l \begin{pmatrix} \delta f_x \\ \delta f_y \\ \delta f_z \end{pmatrix}$$

where $f_e$, $f_n$ and $f_u$ are three components of the specific force vector $f^l = (f_e \; f_n \; f_u)^T = R_b^l f^b = R_b^l (f_x \; f_y \; f_z)^T$, where $f_x$, $f_y$ and $f_z$ are the specific force measurement outputs of the accelerometers.

and R is the mean radius of the Earth.

Measurement Errors:

The sensor measurements can be compensated for the constant biases in both the FOGs and the accelerometers. However, there are still some residual errors which are random in nature. These errors become significant in applications that require long-time surveying. Therefore, these residual random errors are modelled as stochastic processes. The residual gyroscopic measurement errors are correlated in time, therefore they are usually modelled as $1^{st}$ order Gauss-Markov processes as follows [Brown et al., 1992; Gelb, 1979]:

$$\begin{pmatrix} \delta\dot{\omega}_x \\ \delta\dot{\omega}_y \\ \delta\dot{\omega}_z \end{pmatrix} = \begin{pmatrix} -\alpha_x & 0 & 0 \\ 0 & -\alpha_y & 0 \\ 0 & 0 & -\alpha_z \end{pmatrix} \begin{pmatrix} \delta\omega_x \\ \delta\omega_y \\ \delta\omega_z \end{pmatrix} + \begin{pmatrix} \sqrt{2\alpha_x \sigma_{1x}^2} \\ \sqrt{2\alpha_y \sigma_{1y}^2} \\ \sqrt{2\alpha_z \sigma_{1z}^2} \end{pmatrix} W(t) \quad (74)$$

where $\alpha_x$, $\alpha_y$ and $\alpha_z$ are the reciprocals of the time correlation parameters of the random processes associated with the angular velocities measurements;

$\sigma_{1x}$, $\sigma_{1y}$ and $\sigma_{1z}$ are the standard deviations of these random processes;

$W(t)$ is unity-variance white Gaussian noise.

Similarly, the residual accelerometer measurement errors are modelled as $1^{st}$ order Gauss-Markov processes as follows:

$$\begin{pmatrix} \delta \dot{f}_x \\ \delta \dot{f}_y \\ \delta \dot{f}_z \end{pmatrix} = \begin{pmatrix} -\beta_x & 0 & 0 \\ 0 & -\beta_y & 0 \\ 0 & 0 & -\beta_z \end{pmatrix} \begin{pmatrix} \delta f_x \\ \delta f_y \\ \delta f_z \end{pmatrix} + \begin{pmatrix} \sqrt{2\beta_x \sigma_{2x}^2} \\ \sqrt{2\beta_y \sigma_{2y}^2} \\ \sqrt{2\beta_z \sigma_{2z}^2} \end{pmatrix} W(t) \quad (75)$$

where $\beta_x$, $\beta_y$ and $\beta_z$ are the reciprocals of the time correlation parameters of the random processes associated with the specific force measurements;

$\sigma_{2x}$, $\sigma_{2y}$ and $\sigma_{2z}$ are the standard deviations of these random processes.

Equations 71, 72 and 73 for the attitude, position and velocity errors are combined together with equations 74 and 75 for the FOGs and accelerometer errors to describe the behavior of the error state $e^I$ defined in equation 67. The augmented equation is given as a linear system with random system noise as follows:

$$\dot{e}^I = Fe^I + GW(t) \quad (76)$$

where

F is a 15-by-15 matrix known as the dynamic matrix of the error states;

G is a 15-by-1 vector known as the vector associated with the system noise;

W(t) is unity-variance white Gaussian noise.

The linear dynamic system shown in equation 75 can be modelled by the following discrete linear state equation:

$$e_{k+1} = F_{k+1,k} e_k + G_k W_k \quad (77)$$

where $e_{k+1}$ is the error state vector at time $t_{k+1}$;

$e_k$ is the error state vector at time $t_k$;

$F_{k+1,k}$ is the transition matrix of the discrete linear system determined from the dynamic matrix of the error state F as $F_{k+1,k} = I + F\Delta t$, where I is the identity matrix and $\Delta t = t_{k+1} - t_k$;

$W_k$ is the random sequence of system noise.

The problem now is to estimate the error state $e_k$ using the discrete linear state equation given in equation 76. Due to the random noise component existing in this linear state equation, its solution becomes a filtering problem which is usually addressed using discrete Kalman filter theory.

Aided Strapdown Inertial Navigation Employing Kalman Filtering Theory:

Kalman filtering is a well-known technique for applied optimal estimation especially in the field of inertial navigation and kinematic positioning [Brown et al., 1992]. Kalman filtering is applied to enhance the performance of the developed techniques by removing the effect of residual random errors during continuous surveying. In addition, Kalman filter delivers real-time statistical data related to the accuracy of the estimated values. To apply the Kalman filter, an independent measurement equation should be specified in addition to the system equation described in the previous section (equation 76). This measurement equation should be based on an independent measurement of superior accuracy different from the measurements provided by the FOGs and the accelerometers [Hulsing, 1989].

Figure 18:
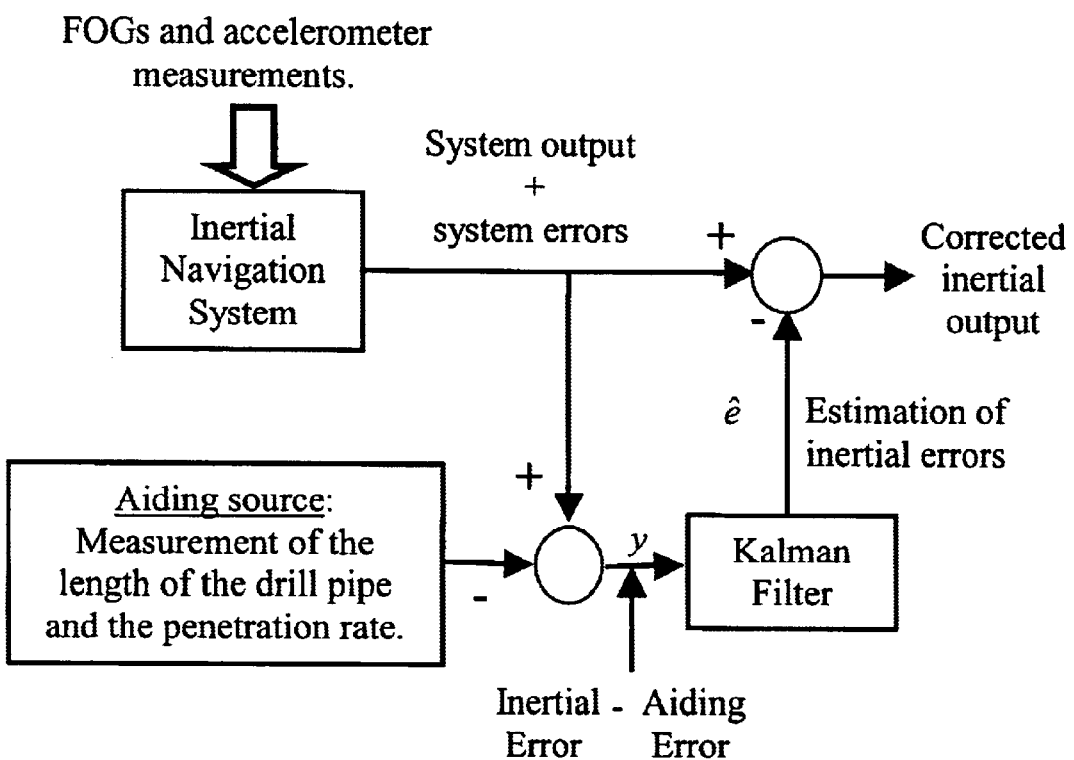
FIG. 18 is a block diagram showing the technique of aided inertial navigation.

In MWD borehole surveying, continuous measurement of the length of the drill pipe as well as real-time measurement of the BHA penetration rate can respectively provide information about the depth of the borehole assembly (i.e. the variable h in the navigation vector) and the three velocity components $V^e$, $V^n$ and $V^u$. This independent measurement provides what is known as aided strapdown inertial navigation. FIG. 18 shows a block diagram of the technique of aided inertial navigation employing Kalman filtering.

The measurements provided by the FOGs and the accelerometers are sent to the surface of the drilling site with an appropriate telemetry technique. These measurements are processed with the surface computer system to provide the navigation parameters (three position components, three velocity components and three attitude angles). The error states are then estimated using Kalman filtering which utilizes the measurement of the length of the drill pipe and the BHA penetration rate as an independent information of superior accuracy. According to the technique of aided inertial navigation [Brown and Hwang, 1992], the length of the drill pipe, L, should be converted first into the corresponding true vertical depth (TVD), h*, as follows:

$$h^* = L \cos \zeta \quad (78)$$

where $\zeta$ Is the inclination angle.

h* Is the true vertical depth as calculated using the length of the drill pipe.

The true vertical depth determined using the length of the drill pipe, h*, is compared to the corresponding value obtained by the computational navigation procedure, h. Similarly, the velocity components determined using the measurements of the BHA penetration rate are compares with the corresponding values obtained by the computational navigation procedure. The error in between is processed by Kalman filter to provide an estimate of the error states ê which is removed from the output of the navigation procedure to deliver corrected inertial output. Therefore, the measurement equation based on the length of the drill pipe as an aiding source is expressed mathematically as follows:

$$y_k = H_k e_k + v_k \quad (79)$$

where $y_k$ is the error in the measurement vector of both the drill pipe length and the penetration rate.

$H_k$ is the design vector of the measurement equation.

$v_k$ is the discrete measurement random noise.

Since the design vector, $H_k$, relates the measurement error in the TVD and the velocity components to the error vector, $e_k$, it can be written as $$H_k = \begin{pmatrix} 0 & 0 & 1 & 0 & 0 & 0 & 0 & 0 & 0 & 0 & 0 & 0 & 0 & 0 & 0 \\ 0 & 0 & 0 & 1 & 0 & 0 & 0 & 0 & 0 & 0 & 0 & 0 & 0 & 0 & 0 \\ 0 & 0 & 0 & 0 & 1 & 0 & 0 & 0 & 0 & 0 & 0 & 0 & 0 & 0 & 0 \\ 0 & 0 & 0 & 0 & 0 & 1 & 0 & 0 & 0 & 0 & 0 & 0 & 0 & 0 & 0 \end{pmatrix} \quad (80)$$

The problem now is to estimate the error states $e_k$ based on the set of independent information $y_k$ with the assumption that the system noise $W_k$ and the measurement noise $v_k$ are uncorrelated. The covariance matrix of the system noise $Q_k$ and the covariance matrix of the measurement noise $R_k$ are given as $$E[W_k W_l^T] = \begin{cases} Q_k & k = l \\ 0 & k \neq l \end{cases} \quad (81)$$

$$E[v_k v_l^T] = \begin{cases} R_k & k = l \\ 0 & k \neq l \end{cases} \quad (82)$$

with $E[W_k v_l^T]=0$ for all values of k and l.

The Kalman filter provides a sequential recursive method for the optimal least mean variance estimation of the system states $e_k$. The Kalman filtering is a two step process. The first step is to make a prediction of the error states based on the estimation of the previous error states. The second step is to update the predicted estimation using the available measurement from the current step. This approach can be quantified as [Schwarz et al., 1999]:

Prediction $$\hat{e}_k(-) = F_{k,k-1} \hat{e}_{k-1}(+)$$

$$P_k(-) = F_{k,k-1} P_{k-1}(+) F_{k,k-1}^T + G_{k-1} Q_{k-1} G_{k-1}^T \quad (83)$$

Where $\hat{e}_k(-)$ is the predicted estimate of the error state at time $t_k$;

$\hat{e}_{k-1}(+)$ is the updated estimate of the error state at time $t_{k-1}$;

$P_k(-)$ is the predicted estimate of the covariance matrix of the estimation error ($P_k(-)=E\{[\hat{e}_k(-)-e_k][\hat{e}_k(-)-e_k]^T\}$).

Update $$\hat{e}_k(+) = \hat{e}_k(-) + K_k[y_k - H_k \hat{e}_k(-)]$$

$$K_k = P_k(-) H_k^T [H_k P_k(-) H_k^T + R_k]^{-1}$$

$$P_k(+) = [I - K_k H_k] P_k(-) \quad (84)$$

where $\hat{e}_k(+)$ is the updated estimate of the error state at time $t_k$;

$K_k$ is the Kalman gain matrix;

$P_k(+)$ is the updated estimate of the covariance matrix of the estimation error ($P_k(+)=E\{[\hat{e}_k(+)-e_k][\hat{e}_k(+)-e_k]^T\}$)

It should be noted that aided inertial navigation based on the length of the drill pipe as an aiding source will improve the accuracy of the navigation parameters on the vertical channel in a more direct way. The parameters of the vertical channel include the true vertical depth h, the vertical velocity $V^u$. On the other hand, the accuracy of all other navigation parameters (horizontal channel parameters) will not be significantly affected by the length of the drill pipe as an aiding source. Alternatively, the independent measurement of the BHA penetration rate will improve the accuracy of the velocity components $V^e$ and $V^n$ and consequently the inclination and roll angles. In addition, the navigation parameters of the horizontal channels (East and North channels) have another advantage. The errors in the navigation parameters of the horizontal channels are bound due to the Schuller effect and oscillate with a period of 84 minutes (a frequency of about 1/5000 known as the Schuller frequency) [Mohammed, 1999; Salychev, 1998].

As mentioned earlier, the technique of aided inertial navigation based on independent measurement of superior accuracy suits the continuous surveying procedure performed inside the radical section of the well. During the station-based surveying, the attitude angles are determined using the procedure shown on FIG. 17. The values determined using this procedure are considered coarse computation and precise computation is still needed to improve the estimation accuracy. The technique of precise computation is known as zero velocity update (ZUPT). The ZUPT technique utilizes the condition of zero velocity existing at each survey station (while the complete surveying setup is stationary) to update the estimate of errors in the Kalman filtering method.

Precise Computation of the Attitude Angles During Station-based Surveying Employing Kalman Filtering Theory:

The augmented linear state equation (equation 76) describing the behavior of the error states in the l-frame and its corresponding discrete representation is used for station-based precise computation. The only change introduced to suit the station-based surveying is to set the velocity components $V^e$, $V^n$ and $V^u$ equal to zero. Therefore, the position error state equation is given as follows (see equation 72):

$$\delta \dot{r}^l = \begin{pmatrix} 0 & \frac{1}{M+h} & 0 \\ \frac{1}{(N+h)\cos\varphi} & 0 & 0 \\ 0 & 0 & 1 \end{pmatrix} \begin{pmatrix} \delta V^e \\ \delta V^n \\ \delta V^u \end{pmatrix} \quad (85)$$

Similarly, the velocity error state equation and the attitude error state equation are given respectively as follows (see equation 73 and 71):

$$\begin{pmatrix} \delta \dot{V}^e \\ \delta \dot{V}^n \\ \delta \dot{V}^u \end{pmatrix} = \begin{pmatrix} 0 & 0 & 0 \\ 0 & 0 & 0 \\ 0 & 0 & \frac{2\gamma}{R} \end{pmatrix} \begin{pmatrix} \delta \varphi \\ \delta \lambda \\ \delta h \end{pmatrix} + \begin{pmatrix} 0 & 2\omega^e \sin\varphi & -2\omega^e \cos\varphi \\ -2\omega^e \sin\varphi & 0 & 0 \\ 2\omega^e \cos\varphi & 0 & 0 \end{pmatrix} \begin{pmatrix} \delta V^e \\ \delta V^n \\ \delta V^u \end{pmatrix} + \begin{pmatrix} 0 & f_u & -f_n \\ -f_u & 0 & f_e \\ f_n & -f_e & 0 \end{pmatrix} \begin{pmatrix} \delta \theta \\ \delta \phi \\ \delta \psi \end{pmatrix} + R_b^l \begin{pmatrix} \delta f_x \\ \delta f_y \\ \delta f_z \end{pmatrix} \text{ and} \quad (86)$$

$$\begin{pmatrix} \delta \dot{\theta} \\ \delta \dot{\phi} \\ \delta \dot{\psi} \end{pmatrix} = \begin{pmatrix} 0 & 0 & 0 \\ \omega^e \sin\varphi & 0 & 0 \\ -\omega^e \cos\varphi & 0 & 0 \end{pmatrix} \begin{pmatrix} \delta \varphi \\ \delta \lambda \\ \delta h \end{pmatrix} + \begin{pmatrix} 0 & \frac{1}{M+h} & 0 \\ \frac{-1}{N+h} & 0 & 0 \\ \frac{-\tan\varphi}{N+h} & 0 & 0 \end{pmatrix} \begin{pmatrix} \delta V^e \\ \delta V^n \\ \delta V^u \end{pmatrix} + \begin{pmatrix} 0 & \omega^e \sin\varphi & -\omega^e \cos\varphi \\ -\omega^e \sin\varphi & 0 & 0 \\ \omega^e \cos\varphi & 0 & 0 \end{pmatrix} \begin{pmatrix} \delta \theta \\ \delta \phi \\ \delta \psi \end{pmatrix} + R_b^l d \quad (87)$$

The measurement error states of both the accelerometer and the FOGs are described as first order Gauss-Markov process and they are expressed as follows:

$$\begin{pmatrix} \delta \dot{\omega}_x \\ \delta \dot{\omega}_y \\ \delta \dot{\omega}_z \end{pmatrix} = \begin{pmatrix} -\alpha_x & 0 & 0 \\ 0 & -\alpha_y & 0 \\ 0 & 0 & -\alpha_z \end{pmatrix} \begin{pmatrix} \delta \omega_x \\ \delta \omega_y \\ \delta \omega_z \end{pmatrix} + \begin{pmatrix} \sqrt{2\alpha_x \sigma_{1x}^2} \\ \sqrt{2\alpha_y \sigma_{1y}^2} \\ \sqrt{2\alpha_z \sigma_{1z}^2} \end{pmatrix} W(t) \text{ and} \quad (88)$$

$$\begin{pmatrix} \delta \dot{f}_x \\ \delta \dot{f}_y \\ \delta \dot{f}_z \end{pmatrix} = \begin{pmatrix} -\beta_x & 0 & 0 \\ 0 & -\beta_y & 0 \\ 0 & 0 & -\beta_z \end{pmatrix} \begin{pmatrix} \delta f_x \\ \delta f_y \\ \delta f_z \end{pmatrix} + \begin{pmatrix} \sqrt{2\beta_x \sigma_{2x}^2} \\ \sqrt{2\beta_y \sigma_{2y}^2} \\ \sqrt{2\beta_z \sigma_{2z}^2} \end{pmatrix} W(t) \quad (89)$$

The augmented error linear state equation during the station-based surveying is obtained by combining equations (85–89). This augmented equation is similar to equation 77 but with different definitions of the dynamic matrix F and the system noise vector G which are given as:

$$F = \begin{pmatrix}
0 & 0 & 0 & 0 & \frac{1}{M+h} & 0 & 0 & 0 & 0 & 0 & 0 & 0 & 0 & 0 & 0 \\
0 & 0 & 0 & \frac{1}{(N+h)\cos\varphi} & 0 & 0 & 0 & 0 & 0 & 0 & 0 & 0 & 0 & 0 & 0 \\
0 & 0 & 0 & 0 & 0 & 1 & 0 & 0 & 0 & 0 & 0 & 0 & 0 & 0 & 0 \\
0 & 0 & 0 & 0 & 2\omega^e\sin\varphi & -2\omega^e\cos\varphi & 0 & f_u & -f_n & 0 & 0 & 0 & r_{11} & r_{12} & r_{13} \\
0 & 0 & 0 & -2\omega^e\sin\varphi & 0 & 0 & -f_u & 0 & f_e & 0 & 0 & 0 & r_{21} & r_{22} & r_{23} \\
0 & 0 & \frac{2\gamma}{R} & 2\omega^e\cos\varphi & 0 & 0 & f_n & -f_e & 0 & 0 & 0 & 0 & r_{31} & r_{32} & r_{33} \\
0 & 0 & 0 & 0 & \frac{1}{M+h} & 0 & 0 & \omega^e\sin\varphi & -\omega^e\cos\varphi & r_{11} & r_{12} & r_{13} & 0 & 0 & 0 \\
\omega^e\sin\varphi & 0 & 0 & \frac{-1}{(N+h)} & 0 & 0 & -\omega^e\sin\varphi & 0 & 0 & r_{21} & r_{22} & r_{23} & 0 & 0 & 0 \\
-\omega^e\cos\varphi & 0 & 0 & \frac{-\tan\varphi}{(N+h)} & 0 & 0 & \omega^e\cos\varphi & 0 & 0 & r_{31} & r_{32} & r_{33} & 0 & 0 & 0 \\
0 & 0 & 0 & 0 & 0 & 0 & 0 & 0 & 0 & -\alpha_x & 0 & 0 & 0 & 0 & 0 \\
0 & 0 & 0 & 0 & 0 & 0 & 0 & 0 & 0 & 0 & -\alpha_y & 0 & 0 & 0 & 0 \\
0 & 0 & 0 & 0 & 0 & 0 & 0 & 0 & 0 & 0 & 0 & -\alpha_z & 0 & 0 & 0 \\
0 & 0 & 0 & 0 & 0 & 0 & 0 & 0 & 0 & 0 & 0 & 0 & -\beta_x & 0 & 0 \\
0 & 0 & 0 & 0 & 0 & 0 & 0 & 0 & 0 & 0 & 0 & 0 & 0 & -\beta_y & 0 \\
0 & 0 & 0 & 0 & 0 & 0 & 0 & 0 & 0 & 0 & 0 & 0 & 0 & 0 & -\beta_z
\end{pmatrix} \quad (90)$$

and $$G = (0\ 0\ 0\ 0\ 0\ 0\ 0\ 0\ 0\ \sqrt{2\alpha_x\sigma_{1x}^2}\ \sqrt{2\alpha_{y\sigma_{1y^2}}}\ \sqrt{2\alpha_{z\sigma_{1z^2}}}\ \sqrt{2\beta_{x\sigma_{2x^2}}}\ \sqrt{2\beta_{y\sigma_{2y^2}}}\ \sqrt{2\beta_{z\sigma_{2z^2}}})^T \quad (91)$$

In the case of station-based surveying, the measurement equation, $y_k = H_k e_k + v_k$, is completely different from the aided inertial navigation technique discussed in the previous section. There is no aiding source that can provide a measurement of superior accuracy. Alternatively, we employ the condition of zero velocity to construct the measurement equation. This condition is introduced because the bottom hole assembly is at a complete rest at each survey station. In these circumstances the error measurement vector $y_k$ is given as follows $$y_k = V^l - V^0 \quad (92)$$

where $V^l$ is the velocity vector expressed in the l-frame, $V^l = (V^e\ V^n\ V^u)^T$;

$V^0$ is the zero velocity vector, $V^0 = (0\ 0\ 0)^T$.

Since the error measurement vector, $y_k$, expresses an error in velocity, the measurement equation is given similarly to equation 79 but with the following definition of the design matrix H, $$H = \begin{pmatrix} 0 & 0 & 0 & 1 & 0 & 0 & 0 & 0 & 0 & 0 & 0 & 0 & 0 & 0 & 0 \\ 0 & 0 & 0 & 0 & 1 & 0 & 0 & 0 & 0 & 0 & 0 & 0 & 0 & 0 & 0 \\ 0 & 0 & 0 & 0 & 0 & 1 & 0 & 0 & 0 & 0 & 0 & 0 & 0 & 0 & 0 \end{pmatrix} \quad (93)$$

Kalman filtering described in equations 83 and 84 can then be applied but using the new definitions for F and H (the dynamic and the design matrices respectively), as well as the new definitions of the G and $y_k$ (the system noise and error measurement vectors).

The precise computation technique described in this section improves the estimation accuracy by removing the residual random noise components existing in the accelerometer and the FOG measurements. Since the ZUPT technique is directly related to the velocity components of the bottom hole assembly, the velocity errors, $\delta V^e$, $\delta V^n$ and $\delta V^u$, will be significantly affected in a more direct way than the position errors, $\delta\phi$, $\delta\lambda$ and $\delta h$, and the attitude errors, $\delta\theta$, $\delta\phi$ and $\delta\psi$. The precise computation usually takes about 10 to 15 minutes for the Kalman filter parameters to converge. The exact time needed for convergence depends mainly on the sensor accuracy and the level of the random noise at their outputs.

As will be apparent to those skilled in the art, various modifications, adaptations and variations of the foregoing specific disclosure can be made without departing from the scope of the invention claimed herein.

REFERENCES

The contents of the following references are hereby incorporated herein as if reproduced herein in their entirety.

Britting K. R.: "Inertial navigation system analysis;" John Wiley and Sons, New York, 1971.

Brown R. G. and Hwang P. Y. C.: "Introduction to random signals;" John Wiley and Sons, New York, 1992.

Conti P. F.: "Controlled horizontal drilling;" Proceedings of SPE/IADC 1989 Drilling Conference, New Orleans, La. pp: 749–754, Feb. 28–Mar. 3, 1989.

Disperio R.: "Method of correcting for axial error components in magnetometer reading during wellbore survey operation; " U.S. Pat. No. 5,452,518, 1995.

Engebretson H.: "Error reduction in compensation of drill string interference for magnetic survey tools;" U.S. Pat. No. 5,155,916, 1992.

Gelb A.: "Applied optimal estimation;" MIT Press, Cambridge, England, 1989.

Grindord S. and Wolf C.: "Calculation of NMDC length required for various latitudes developed from field measurements of drill string magnetization;" Proceedings of SPE/IADC 1983 Drilling Conference, New Orleans, Tex. pp: 217–224, Feb. 20–23, 1983.

Hartman R.: "Method of qualifying a borehole survey:" U.S. Pat. No. 5,787,997, 1998.

Helm W.: "Method and apparatus for measurement of azimuth of a borehole while drilling;" U.S. Pat. No. 5,012,412, 1991.

Hulsing R.: "Borehole survey system utilizing strapdown inertial navigation;" U.S. Pat. No. 4,812,977, 1989.

Lefevre H.: "The fiber optic gyroscope;" Artech-House, (USA), 1993.

Kim B. Y.: "Optical fiber rotation sensing;" Academic press Inc, New York (USA) 1994.

Merhav, S.: "Aerospace sensor systems and applications;" Springer, N.Y. (USA), 1993.

Mohamed A. H.: "Optimizing the estimation procedure in INS/GPS integration for kinematic applications;" *Ph.D. thesis,* Department of Geomatics Engineering, University of Calgary, UCGE report # 20127, April 1999.

Molnar, D. O. "Borehole Inertial Guidance System" U.S. Pat. No. 4,542,647.

Nichelson J.: "Method for determining borehole direction;" U.S. Pat. No. 5,435,969, 1995.

Noureldin A., Mintchev M., Irvine-Halliday D. and Tabler H.: "Computer modelling of microelectronic closed loop fiber optic gyroscope;" Proceedings of the IEEE Canadian Conference on Electrical and Computer Engineering; Edmonton, Canada, pp: 633–638, May 9–12, 1999.

Noureldin A., Tabler H., Irvine-Halliday D. and Nintchev M.: "Quantitative study of the applicability of fiber optic gyroscopes for measurement-while-drilling borehole surveying;" Journal of the Society of Petroleum Engineers (SPE), accepted for publication, May 2000.

Parkinson W. D.: "Introduction to Geomagnetism;" Scottish Academic Press, 1983.

Rehm W. A. Garcia A. and Cia S. A.: "Horizontal drilling in mature oil fields;" Preceedings of SPE/IADC 1989 Drilling Conference, New Orleans, La., pp: 755–764, Feb. 29–Mar. 3, 1989.

Russel, M. K. and Russel A. W.: "Surveying of boreholes;" U.S. Pat. No. 4,163,324, 1979.

Salychev O.: "Intertial systems in navigation and geophysics;" Bauman MSTU Press, Moscow, 1998.

Schwarz K. P. and Wei M.: "INS/GPS integration for geodetic applications;" Lecture notes for ENGO 623, Department of Geomatics Engineering at the University of Calgary, 1999.

Schwarz K. P. and Wei M.: "A framework for modelling kinematic measurements in gravity field applications;" *Bulleting Geodesique,* v 64 (4), 331–346, October 1990.

Sheills G., Kerridge D.: "Borehole surveying;" U.S. Pat. No. 6,021,577, 2000.

Skillingstad T.: "At-bit inclination measurements improves directional drilling efficiency and control;" Proceedings of SPE/IADC 2000 Drilling Conference, New Orleans, La., Feb. 23–25, 2000.

Stephenson M. A. and Wilson H.: "Improving quality control of directional survey data with continuous inertial navigation;" SPE Drilling Engineering, v 7 (2), pp: 100–105, June 1992.

Thorogood J. L.: "How to specify and implement well surveys;" World Oil, July 1986.

Thorogood J. L. and Knott, D. R.: "Surveying techniques with a solid state magnetic multi-shot device;" Proceedings of SPE/IADC 1989 Drilling Conference, New Orleans, La., pp: 841–856, Feb. 28–Mar. 3, 1989.

Thorogood J. L.: "Instrument performance models and their application to directional surveying operations;" SPE Drilling Engineering, v 5 (4), pp: 294–298, December 1990.

Titterton D. H. and Weston, J. L.: "Strapdown inertial navigation technology;" Peter Peregrinus Ltd., London, UK, 1997.

Trowsdale L.: "Borehole survey method and apparatus for drilling substantially horizontal boreholes;" U.S. Pat. No. 4,361,192, 1982.

Van Dongen J., Maekiaho L.: "Method for determining the azimuth of a borehole;" U.S. Pat. No. 4,682,421, 1987.

Yakowitz S. and Szidarovszky F.: "An introduction to numerical computations;" $2^{nd}$ edition, Macmillan publication company, New York, 1989.

What is claimed is:

1. A method of continuous measurement-while-drilling ("MWD") surveying the progress of a bottom hole assembly ("BHA") having a tool-spin axis, an azimuth angle and a tool face angle, said method comprising the steps of:

(a) providing a toroidal fiber-optic gyroscope within the BHA, wherein said gyroscope is oriented horizontally when the BHA is oriented vertically and defines a central passage for the flow of drilling fluid; and (b) monitoring the rotation of the BHA about the tool-spin axis with the gyroscope.

2. The method of claim 1 wherein the rotation of the BHA about the tool-spin axis is used to determine the azimuth angle of the BHA during a vertical section of the wellbore and an initial portion of a radical section of the wellbore.

3. The method of claim 2 wherein the rotation of the BHA about the tool-spin axis is used to determine the tool face angle subsequent to the initial portion of the radical section of the wellbore.

4. The method of claim 2 wherein the initial portion of the radical section of the well is that portion having an inclination less than about 45°.

5. The method of claim 4 wherein the inclination is less than about 30°.

6. The method of claim 5 wherein the inclination is less than about 20°.

7. The method of claim 1 further comprising the step of monitoring the rotation of the BHA about an axis normal to the tool-spin axis using a second gyroscope and determining changes in the tool-face angle of the BHA during drilling of a vertical section and an initial portion of the radical section of the well and thereafter changes in the azimuth angle of the BHA.

8. The method of claim 1 further comprising the step of determining a pitch angle using three mutually orthogonal accelerometers and determining the time rate of change of the pitch angle.

9. The method of claim 1 further comprising the step of compensating for gyroscope drift.

10. The method of claim 1 further comprising the step of correcting inertial output of the method by estimating error states using Kalman filtering and independent information as an aiding source.

11. The method of claim 10 wherein the independent information comprises measurements of the length of drill pipe and BHA penetration rate.

\* \* \* \* \*